US009216779B2

(12) United States Patent
Zha

(10) Patent No.: US 9,216,779 B2
(45) Date of Patent: Dec. 22, 2015

(54) LOW DRAG LOW NOISE DEVICES USING JET FLOW CONTROL

(71) Applicant: Dialectic Flow Technologies, LLC, Coral Gables, FL (US)

(72) Inventor: Gecheng Zha, Cutler Bay, FL (US)

(73) Assignee: Dialectric Flow Technologies, LLC, Coral Gables, FL (US)

( * ) Notice: Subject to any disclaimer, the term of this patent is extended or adjusted under 35 U.S.C. 154(b) by 0 days.

(21) Appl. No.: 14/620,520

(22) Filed: Feb. 12, 2015

(65) Prior Publication Data

US 2015/0158439 A1  Jun. 11, 2015

Related U.S. Application Data

(63) Continuation-in-part of application No. 14/180,406, which is a continuation-in-part of application No. PCT/US2013/053191, filed on Aug. 1, 2013.

(60) Provisional application No. 61/976,204, filed on Apr. 7, 2014, provisional application No. 61/765,219, filed on Feb. 15, 2013.

(51) Int. Cl.
*B60R 1/06* (2006.01)
*B62D 35/00* (2006.01)

(52) U.S. Cl.
CPC . *B62D 35/00* (2013.01); *B60R 1/06* (2013.01); *B62D 35/008* (2013.01)

(58) Field of Classification Search
CPC ......... B62D 35/00; B62D 35/008; B60R 1/06
USPC ......................................... 359/871; 296/1.11
See application file for complete search history.

(56) References Cited

U.S. PATENT DOCUMENTS

| | | | |
|---|---|---|---|
| 2,796,506 A | 6/1957 | Lumbert | |
| 3,059,540 A * | 10/1962 | Robinson | B60R 1/0602 296/91 |
| 3,069,119 A | 12/1962 | Ferri | |
| 3,072,431 A | 1/1963 | Shumaker | |
| 3,826,563 A | 7/1974 | Davis | |
| 3,960,402 A | 6/1976 | Keck | |
| 3,972,494 A * | 8/1976 | Drews | B62D 35/00 114/67 A |

(Continued)

FOREIGN PATENT DOCUMENTS

| | | |
|---|---|---|
| CN | 102381253 A | 3/2012 |
| DE | 2704226 B1 | 8/1978 |

(Continued)

OTHER PUBLICATIONS

International Search Report and Written Opinion, PCT/US2013/053191 dated Nov. 28, 2013.

(Continued)

*Primary Examiner* — Frank Font
(74) *Attorney, Agent, or Firm* — Buchanan Nipper

(57) ABSTRACT

Low drag low noise devices are described herein that use passive jet flow control to reduce the drag and noise created by motor vehicles (e.g., motor vehicle side view mirrors) while the motor vehicles travel through a fluid. The low drag low noise devices described herein comprise a lengthwise axis, an outer body, and an inner body. The outer body and the inner body cooperatively define a channel through which fluid can pass during use.

20 Claims, 17 Drawing Sheets

(56) References Cited

U.S. PATENT DOCUMENTS

| | | | |
|---|---|---|---|
| 3,990,774 A | 11/1976 | Gotz | |
| 3,999,797 A | 12/1976 | Kirsch et al. | |
| 4,214,787 A | 7/1980 | Chain | |
| 4,433,865 A | 2/1984 | Crompton, Jr. | |
| 4,449,796 A | 5/1984 | Janssen et al. | |
| 4,538,851 A | 9/1985 | Taylor | |
| 4,550,988 A | 11/1985 | Harder et al. | |
| 4,580,881 A | 4/1986 | Kim | |
| 4,585,316 A | 4/1986 | Knutson et al. | |
| 4,718,755 A | 1/1988 | Olson et al. | |
| 4,898,458 A | 2/1990 | McDonald | |
| 4,981,072 A | 1/1991 | Hanson et al. | |
| 5,069,538 A | 12/1991 | Shust et al. | |
| 5,179,470 A | 1/1993 | Olson | |
| 5,199,762 A | 4/1993 | Scheele et al. | |
| 5,280,990 A | 1/1994 | Rinard | |
| 5,815,315 A | 9/1998 | Garland et al. | |
| 5,868,867 A | 2/1999 | Clukey | |
| 5,903,389 A | 5/1999 | Rumez et al. | |
| 5,908,217 A * | 6/1999 | Englar | B62D 37/02 296/180.1 |
| D427,127 S | 6/2000 | Horowitz | |
| 6,290,361 B1 | 9/2001 | Berzin | |
| 6,702,448 B2 | 3/2004 | Tanaka | |
| 6,926,432 B2 | 8/2005 | Rodriguez Barros et al. | |
| 7,025,920 B2 | 4/2006 | Pavao et al. | |
| 8,167,442 B1 | 5/2012 | Hidden | |
| 8,191,955 B2 | 6/2012 | August | |
| 8,485,674 B2 | 7/2013 | Jenssen | |
| 2011/0217163 A1 | 9/2011 | Camci | |
| 2012/0154911 A1 | 6/2012 | Huynh | |
| 2013/0148219 A1* | 6/2013 | Oswald | B60R 1/06 359/871 |
| 2013/0270856 A1* | 10/2013 | Laudet | B62D 35/001 296/180.3 |
| 2014/0233123 A1 | 8/2014 | Zha | |

FOREIGN PATENT DOCUMENTS

| | | | |
|---|---|---|---|
| DE | 4028983 A1 | 3/1992 | |
| DE | 4039484 A1 * | 6/1992 | ............... B60R 1/06 |
| DE | 102007002567 A1 | 7/2008 | |
| EP | 0069164 A1 | 12/1983 | |
| EP | 2511138 A1 | 10/2012 | |
| EP | 2607172 A1 | 6/2013 | |
| FR | 2893566 A1 * | 5/2007 | ............... B60R 1/06 |
| FR | 2912977 A1 | 8/2008 | |
| GB | 2048191 A1 | 12/1980 | |
| GB | 2058695 A | 4/1981 | |
| GB | 2442457 A | 4/2008 | |
| GB | 2468289 A | 9/2010 | |
| JP | 10152023 A | 6/1998 | |
| JP | 2012201359 A | 10/2012 | |
| JP | 2013100037 A | 5/2013 | |
| WO | 9737871 A1 | 10/1997 | |
| WO | 2011058338 A1 | 5/2011 | |
| WO | 2013091058 A1 | 6/2013 | |
| WO | 2014126610 A1 | 8/2013 | |

OTHER PUBLICATIONS

International Search Report and Written Opinion, PCT/US2015/015578 dated May 19, 2015.

Wang, et al., "Low Drag Automotive Mirrors Using Passive Jet Flow Control", SAE Int. J. Passeng. Cars-Mech. Syst. 7(2):2014,doi 10.4271/2014-01-0584.

Office Action dated Jun. 26, 2015, Applicant's co-pending U.S. Appl. No. 14/180,406, BN Matter: Hilary Gutman.

* cited by examiner

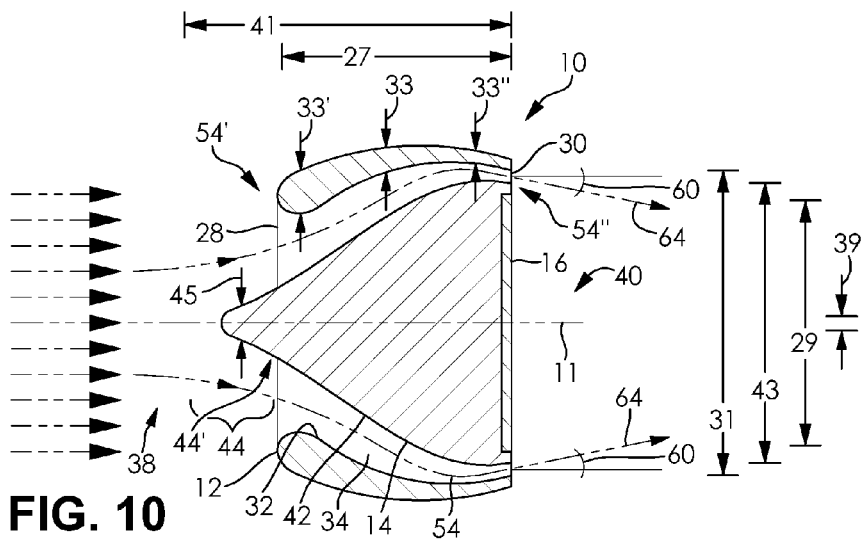
FIG. 10
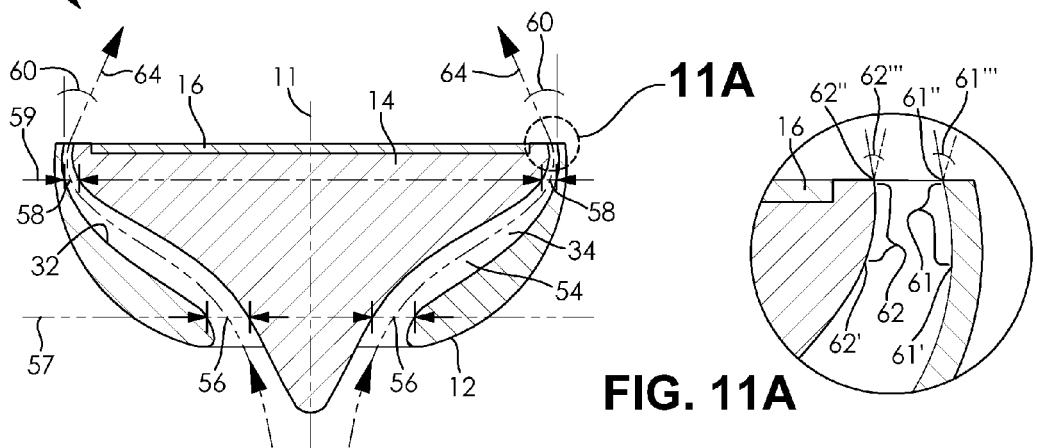
FIG. 11
FIG. 11A
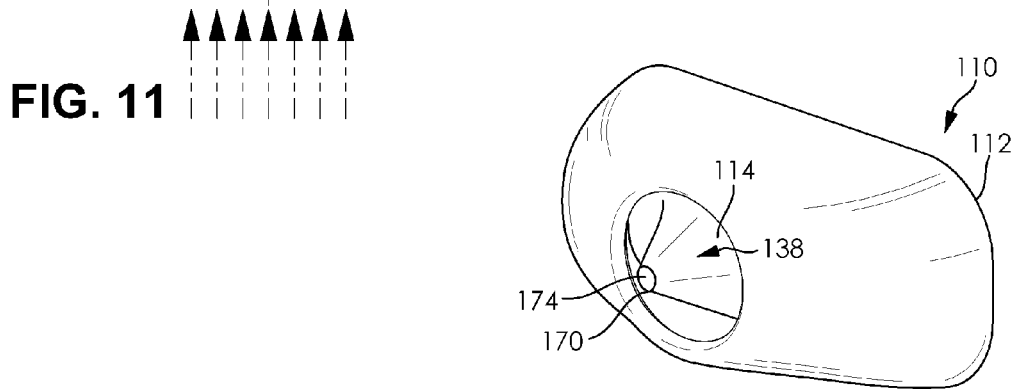
FIG. 12

US 9,216,779 B2

LOW DRAG LOW NOISE DEVICES USING JET FLOW CONTROL

PRIORITY/CROSS-REFERENCE TO RELATED APPLICATIONS

This application claims the benefit of U.S. Provisional Application No. 61/976,204, filed Apr. 7, 2014, and is a continuation-in-part of U.S. Nonprovisional application Ser. No. 14/180,406, filed Feb. 14, 2014, which is a continuation-in-part of International Application No. PCT/US2013/053191, filed Aug. 1, 2013, which claims the benefit of Provisional Application No. 61/765,219, filed Feb. 15, 2013. The entire contents of each of these related applications are hereby incorporated into this disclosure by reference.

FIELD

The disclosure relates generally to low drag low noise devices. More specifically, the disclosure relates to various embodiments of low drag low noise devices that use passive jet flow control to reduce the level of both drag and noise. The low drag low noise devices described herein can be used to reduce the drag and noise on any suitable motor vehicle (e.g., automobile, car, truck, motorcycle, boat, locomotive, aircraft, airplane, projectile) or device, such as an external side view mirror attached to a motor vehicle (e.g., automobile, car, truck, motorcycle, boat, locomotive, aircraft, airplane, projectile).

BACKGROUND

Motor vehicles, such as automobiles, cars, trucks, motorcycles, boats, locomotives, aircrafts, airplanes, projectiles, and the like, have emerged as the dominant form of human transportation in the modern world and are capable of transporting a human operator and passengers over great distances at great speeds relative to older forms of transportation. The speed at which a motor vehicle can travel can vary based on a number of factors, such as the type of motor vehicle being used, the material on which the motor vehicle is travelling, and the fluid through which the motor vehicle is travelling. In some cases, the speed at which a motor vehicle can travel can vary and range from between ten miles an hour up to above four hundred miles an hour. These speeds are enough to cause significant aerodynamic drag on the motor vehicle as it travels through a fluid. As a result, most motor vehicles are aerodynamically designed and use the concepts of fluid dynamics such that the fluid through which the car is travelling (e.g., air) can be directed over and around the body of the motor vehicle to achieve a reduction in drag relative to motor vehicles that are not aerodynamically designed. In addition, by aerodynamically designing the motor vehicle, the performance and gas mileage of the motor vehicle can be increased.

A significant portion of the drag forces applied to a motor vehicle during travel are a result of the external side view mirrors that generally protrude from the vehicle cabin. Each of FIGS. 1, 2, and 3, illustrate a common shape of a side view mirror. During travel, each of these mirrors is exposed to the oncoming flow of fluid, which increases the drag applied to the motor vehicle and reduces fuel efficiency. The drag percentage created by the external side view mirrors is greater for smaller and lighter vehicles (e.g., electric cars, Formula 1, Smart, Mini Cooper), which have an overall less capture area (e.g., the maximum cross-sectional area of the vehicle perpendicular to the vehicle moving direction) than larger motor vehicles traveling at the same speed. Therefore, drag forces can more readily decelerate smaller vehicles.

Apart from drag force, another product of a motor vehicle travelling through a fluid, such as air, is noise. Most noise created during travel and heard by an operator when operating the motor vehicle does not come from the engine. Instead, the noise is a product of the flow of fluid around the motor vehicle. In particular, the side view mirrors are one of the major sources of noise that the operator and any other occupants of the vehicle hear during travel.

Drag and noise are a direct result of the flow conditions created by the shape of the side view mirrors. For example, flow conditions such as high turbulent pressure fluctuations and vortex shedding create drag, noise, and a low base pressure behind the flat rear surface of the mirror as a motor vehicle travels through a fluid. In addition, these flow conditions create a condition referred to as base flow. An example of how vortex shedding is created by using a common side view mirror can be seen in FIG. 4, which illustrates the side view mirror travelling through air that is illustrated as streamlines travelling around the side view mirror. As illustrated, the flow conditions are a result of the side view mirror having a streamlined front surface and abruptly terminating in a flat back (e.g., the mirror). These conditions are also created behind the flat, or substantially flat, surfaces of the motor vehicle, such as the rear end of the motor vehicle.

The present disclosure provides a low noise low drag device that uses jet flow control to reduce the effects of base flow vortex shedding, and thereby reduce the noise and drag. The present disclosure achieves this reduction in drag and noise by manipulating the flow of fluid (e.g., air) around the low drag low noise device to create directed jet(s) of air around the flat, or substantially flat, surface on the rear of the device (e.g., the mirror of a side view mirror) or the motor vehicle (e.g., rear end) creating a virtual trailing edge, or boat-tail, that reduces or removes vortex shedding. Thus, the jet(s) produced by the low drag low noise devices described herein act to counter base flow and reduce drag and noise.

BRIEF DESCRIPTION OF THE DRAWINGS

FIG. 4 illustrates streamlines of the flow field depicting how the motor vehicle external side view mirror causes vortex shedding.

FIG. 10 is a sectional view of the low drag low noise device illustrated in FIG. 6, taken along line 10-10. FIG. 10 depicts the low drag low noise device subjected to a flow field and how fluid flows through the low drag low noise device.

FIG. 11 is a sectional view of the low drag low noise device illustrated in FIG. 6, taken along line 11-11. FIG. 11 depicts the low drag low noise device subjected to a flow field and how fluid flows through the low drag low noise device.

FIG. 11A is a magnified view of area 11A illustrated in FIG. 11.

FIG. 12 is a front perspective view of another low drag low noise device.

FIG. 17 depicts the low drag low noise device subjected to a flow field and how fluid flows through the low drag low noise device.

FIG. 18 depicts the low drag low noise device subjected to a flow field and how fluid flows through the low drag low noise device.

DETAILED DESCRIPTION

Figure 1:
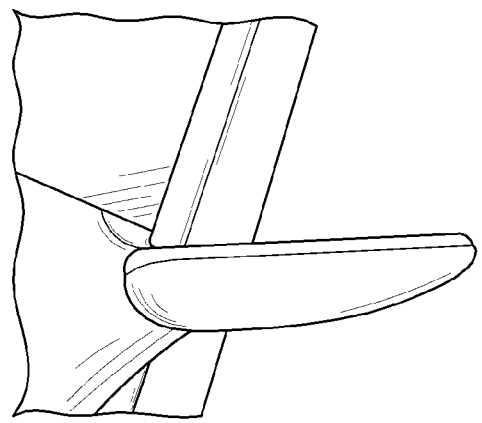
FIG. 1 is a top view of a portion of a motor vehicle with an attached external side view mirror.
Figure 2:
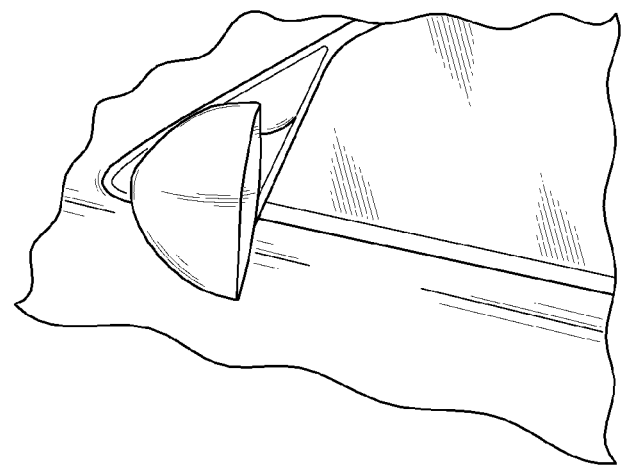
FIG. 2 is a side view of a portion of another motor vehicle with an attached external side view mirror.
Figure 3:
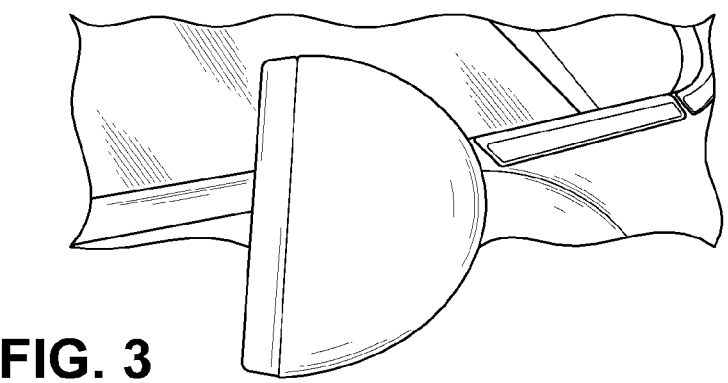
FIG. 3 is a side view of a portion of another motor vehicle with an attached external side view mirror.
Figure 4:
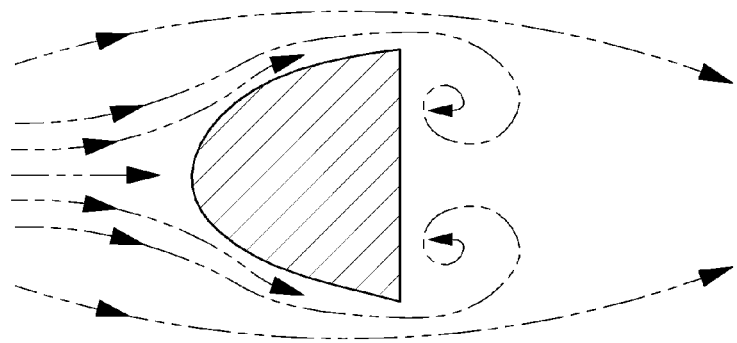
FIG. 4 is a side view of a motor vehicle external side view mirror subjected to a flow field.
Figure 5:
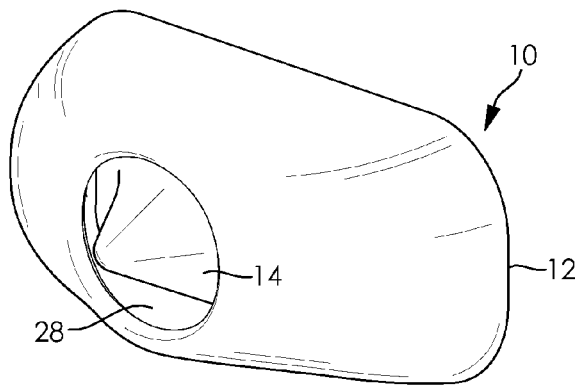
FIG. 5 is a front perspective view of a low drag low noise device.
Figure 6:
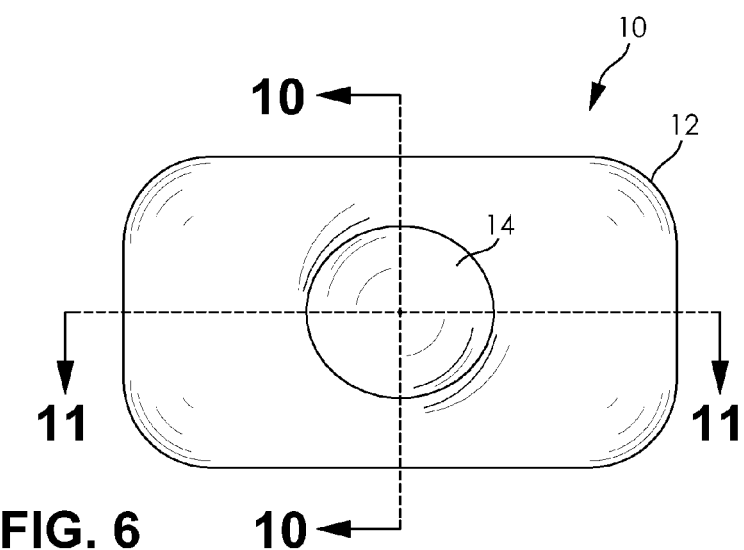
FIG. 6 is a front view of the low drag low noise device illustrated in FIG. 5.
Figure 7:
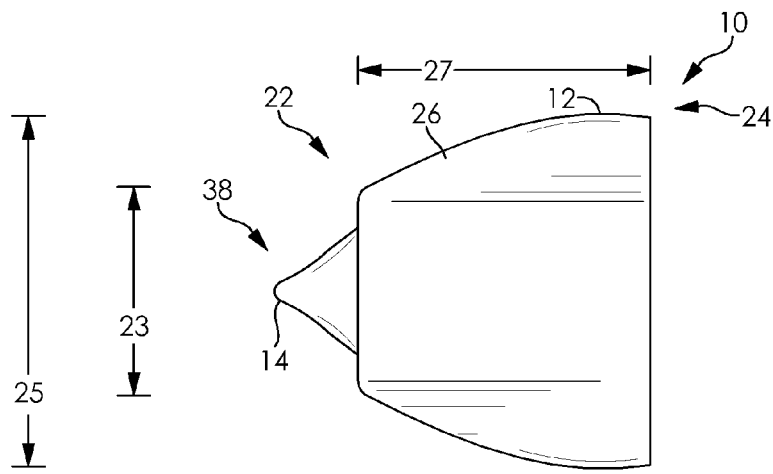
FIG. 7 is a right side view of the low drag low noise device illustrated in FIG. 5.
Figure 8:
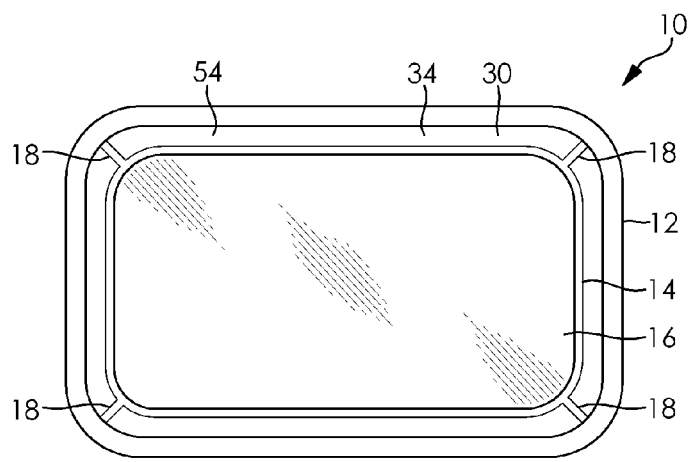
FIG. 8 is a rear view of the low drag low noise device illustrated in FIG. 5.

The following description and the referenced drawings provide illustrative examples of that which the inventor regards as his inventions. As such, the embodiments discussed herein are merely exemplary in nature and are not intended to limit the scope of the inventor's inventions, the claims, or their protection, in any manner. Rather, the description and illustration of these illustrative examples serve to enable a person of ordinary skill in the relevant art to practice the inventions.

The use of "e.g.," "etc.," "for instance," "in example," "for example," and "or" and grammatically related terms indicates non-exclusive alternatives without limitation, unless otherwise noted. The use of "including" and grammatically related terms means "including, but not limited to," unless otherwise noted. The use of the articles "a," "an," and "the" are meant to be interpreted as referring to the singular as well as the plural, unless the context clearly dictates otherwise. Thus, for example, reference to "an opening" includes two or more such openings, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary", means "an example of" and is not intended to convey a meaning of an ideal or preferred embodiment. The use of "attached" refers to the fixed, releasable, or integrated association of two or more elements and/or devices. Thus, the term "attached," and grammatically related terms, includes releasably attaching or fixedly attaching two or more elements and/or devices. The use of "diameter" refers to the length of a straight line passing from side to side through the center of a body, element, or feature, and does not impart any structural configuration on the body, element, or feature. The use of "circumference" refers to a displacement measured along the exterior surface area of a body, element, or feature and does not impart any structural configuration of the body, element, or feature (e.g., the perimeter of a body, element, or feature). Words of approximation (e.g., "substantially," "generally," "about"), as used in context of the specification and figures, are intended to take on their ordinary and customary meanings, which denote approximation, unless the context clearly dictates otherwise.

Several exemplary low drag low noise devices are described herein. Any of the exemplary devices can be attached to any suitable object using any suitable method of attachment, and skilled artisans will be able to select a suitable low drag low noise device to attach to an object and a suitable method of attachment according to a particular embodiment based on various considerations, such as the material(s) that form the object. In the embodiments described herein, some of the low drag low noise devices are described as a side view mirror that can be attached to a motor vehicle such that the motor vehicle has reduced drag and noise features. In other embodiments, the low drag low noise devices are described as being attached to, or formed as part of, a motor vehicle. The motor vehicle can comprise any suitable motor vehicle, such as those described herein (e.g., automobile, car, truck, motorcycle, boat, locomotive, aircraft, airplane, projectile). It is to be noted, however, that the elements, features, and components described herein are not limited to these examples and can be used in any suitable manner to create any suitable low drag low noise device.

FIGS. 5, 6, 7, 8, 9, 10, 11, and 11A illustrate a first low drag low noise device 10. The low drag low noise device 10 comprises a lengthwise axis 11, an outer body 12, inner body 14, mirror 16, and a plurality of connection fins 18.

The outer body 12, inner body 14, and each connection fin of the plurality of connection fins 18 of low drag low noise device 10 can be formed of any suitable material and manufactured using any suitable technique. Skilled artisans will be able to select a suitable material to form an outer body, inner body, and connection fin(s) of a low drag low noise device and a suitable technique to manufacture the outer body, inner body, and the connection fin(s) of a low drag low noise device according to a particular embodiment based on various considerations, including the intended use of the low drag low noise device. Example materials considered suitable to form the outer body, inner body, and connection fin(s) of a low drag low noise device include metals, plastics, combinations of metals and plastics, composite materials, and any other material considered suitable for a particular embodiment. Example methods of manufacture considered suitable to manufacture the outer body, inner body, and connection fin(s) of a low drag low noise device include injection molding, machining, 3D printing, and any other method of manufacture considered suitable for a particular embodiment.

The outer body 12 comprises a first end 22, a second end 24, an outer surface 26, and a length 27. The outer body 12 defines a first opening 28, a second opening 30, an inner surface 32, and a passageway 34.

In the illustrated embodiment of FIGS. 5, 6, 7, 8, 9, 10, 11, and 11A, the first end 22 of the outer body 12 comprises a generally circular outer surface 26 and the second end 24 of the outer body 12 comprises a generally rectangular outer surface 26. The generally circular outer surface 26 of the first end 22 is lofted into the general rectangular outer surface 26 of the second end 24. The first end 22 has an outside diameter 23 and the second end 24 has an outside diameter 25. The outside diameter 23 of the first end 22 is less than the outside diameter 25 of the second end 24. This provides a streamlined and aerodynamic shape. In this illustrated embodiment, the generally rectangular outer surface 26 of the second end 24 has a width equal to 7.0 centimeters and a height of 5 centimeters. While particular widths and heights have been illustrated other widths and heights are considered suitable.

The length 27 of the outer body 12 extends from the first end 22 to the second end 24 of the outer body 12 and is measured on an axis that is parallel to the lengthwise axis 11 of the low drag low noise device 10. The outer body of a low drag low noise device can have any suitable length, and skilled artisans will be able to select a suitable length for the outer body of a low drag low noise device according to a particular embodiment based on various considerations, including the desired flow characteristics intended to be achieved. Example lengths considered suitable for the outer body of a low drag low noise device include lengths equal to 5.0 centimeters, equal to about 5.0 centimeters, equal to 7.0 centimeters, equal to about 7.0 centimeters, equal to between 1.0 centimeter and 10.0 centimeters, equal to between about 1.0 centimeter and about 10.0 centimeters, equal to between 5.0 centimeters and 7.0 centimeters, and equal to between about 5.0 centimeters and about 7.0 centimeters.

The first opening 28 is defined on the first end 22 of the outer body 12, has a curved leading edge, and has a diameter 29 that is measured on an axis that is perpendicular to the lengthwise axis 11 of the low drag low noise device 10. The second opening 30 is defined on the second end 24 of the outer body 12 and has a diameter 31 that is measured on an axis that is perpendicular to the lengthwise axis 11 of the low drag low noise device 10. In the embodiment illustrated in FIGS. 5, 6, 7, 8, 9, 10, 11, and 11A, the diameter 29 of the first opening 28 is less than the diameter 31 of the second opening 30.

While the first opening 28 has been illustrated as generally circular and the second opening 30 has been illustrated as generally rectangular, the first opening and second opening defined by an outer body can have any suitable structural configuration. Skilled artisans will be able to select a suitable structural configuration for a first opening and/or second opening defined by an outer body according to a particular embodiment based on various considerations, including the desired flow characteristics intended to be achieved by a low drag low noise device. Example structural configurations considered suitable for a first opening and/or second opening defined by an outer body include circular, triangular, square, rectangular, elliptical, oval, and any other structural configuration considered suitable for a particular embodiment.

While the first end 22 of the outer body 12 has been illustrated as defining a first opening 28, the first end of an outer body can define any suitable number of openings, and skilled artisans will be able to select a suitable number of openings to define on the first end of an outer body according to a particular embodiment based on various considerations, including the desired flow characteristics intended to be achieved by a low drag low noise device. Example number of openings considered suitable to define on the first end of an outer body include one, at least one, two, a plurality, three, four, five, and any other number considered suitable for a particular embodiment.

While the first end 22 of the outer body 12 has been illustrated as having a curved leaded edge, the first end of an outer body can have any structural configuration, and skilled artisans will be able to select a suitable structural configuration for the first end of an outer body according to a particular embodiment based on various considerations, including the desired effect the first end has on fluid during use. Example alternative structural arrangements considered suitable for the first end of an outer body include rounded, flat, pointed, tapered, and any other structural arrangement considered suitable for a particular embodiment.

The inner surface 32 of the outer body 12 extends from the first opening 28 to the second opening 30 and defines the passageway 34, which extends through the outer body 12. As illustrated best in FIGS. 10 and 11, the inner surface 32 of the outer body 12 extends away from the lengthwise axis 11 of the low drag low noise device 10 from the first end 22 to the second end 24 of the outer body 12. Thus, the passageway 34 is formed such that it diverges and has a diameter that increases from the first end 22 to the second end 24 of the outer body 12.

While not illustrated, the outer body 12 can include one or more structures to attach the outer body 12 to another component (e.g., the door, or body, of a motor vehicle). Skilled artisans will be able to select a suitable structure to include on the outer body of a low drag low noise device according to a particular embodiment based on various considerations, including the structural arrangement of the component to which the low drag low noise device is intended to be attached. For example, the outer body of a low drag low noise device can include one or more attachment mechanisms or attachment arms to attach the low drag low noise device to a component, such as a motor vehicle.

The outer body 12 has a thickness that decreases from the first end 22 to the second end 24 of the outer body 12. As best illustrated in FIG. 10, the outer body 12 has a first thickness 33' between the first end 22 and the second end 24 of the outer body 12 and a second thickness 33" between the first thickness 33' and the second end 24 of the outer body 12. The second thickness 33" is less than the first thickness 33'. The first thickness 33' is measured on an axis that is disposed perpendicular to the lengthwise axis 11 of the low drag low noise device 10. The second thickness 33" is measured on an axis that is disposed perpendicular to the lengthwise axis 11 of the low drag low noise device 10.

While the outer body 12 has been illustrated as having a thickness that decreases from the first end 22 to the second end 24, the outer body of a low drag low noise device can have any suitable thickness. Skilled artisans will be able to select a suitable thickness for the outer body of a low drag low noise device according to a particular embodiment based on various considerations, including the desired effect of the outer body on fluid that is intended to pass around and through the low drag low noise device. For example, the outer body can have a thickness that is constant, substantially constant, that is greater at the second end than at the first end of the outer body, or any other configuration considered suitable for a particular embodiment.

In the illustrated embodiment, the inner body 14 is partially disposed within the passageway 34 defined by the outer body 12 and is attached to the outer body 12 using the plurality of connection fins 18, as described in more detail herein. The inner body 14 comprises a first end 38, a second end 40, a length 41, and an outer surface 42 that has a circumference.

The first end 38 of the inner body 14 is disposed outside of the passageway 34 defined by the outer body 12 and has a curved leading edge. First end 38 is disposed outside of passageway 34 such that a section 44 of the inner body 14 is disposed outside of the passageway 34 defined by the outer body 12. However, alternative embodiments can include an inner body that has a first end disposed entirely within the passageway defined by an outer body, or a first end that is disposed on a plane that contains the first end of the outer body. The section 44 of the inner body 14 disposed outside of the passageway 34 extends from the first end 38 of the inner body 14 toward the second end 40 of the inner body 14 to a section end 44'. Section 44 has a generally conical outer surface 42 that is lofted toward the second end 40 of the inner body 14 and increases in diameter from the first end 38 of the inner body 14 to the section end 44'. The second end 40 of the inner body 14 comprises a generally rectangular outer surface 42. The generally conical outer surface 42 of section 44 is lofted into the generally rectangular outer surface 42 of the second end 40 such that the inner body 14 tapers from the second end 40 to the first end 38.

The first end 38 of the inner body 14 has an outside diameter 39 and the second end 40 of the inner body 14 has an outside diameter 43. The outside diameter 39 of the first end 38 is measured on an axis that is disposed perpendicular to the lengthwise axis 11 of the low drag low noise device 10. The outside diameter 43 of the second end 40 is measured on an axis that is disposed perpendicular to the lengthwise axis 11 of the low drag low noise device 10. The outside diameter 39 of the first end 38 is less than the outside diameter 43 of the second end 40.

The length 41 of the inner body 14 extends from the first end 38 to the second end 40 of the inner body 14 and is measured on an axis that is parallel to the lengthwise axis 11 of the low drag low noise device 10. The length 41 of the inner body 14 is different than the length 27 of the outer body 12. In the embodiment illustrated, the length 41 of the inner body 14 is greater than the length 27 of the outer body 12. Alternatively, the length of the inner body of a low drag low noise device can be less than, or equal to, the length of the outer body of the low drag low noise device.

The inner body of a low drag low noise device can have any suitable length, and skilled artisans will be able to select a suitable length for the inner body of a low drag low noise device according to a particular embodiment based on various considerations, including the desired flow characteristics intended to be achieved. Example lengths considered suitable for the inner body of a low drag low noise device, such as a side view mirror, include lengths equal to 10.0 centimeters, equal to about 10.0 centimeters, equal to 15.0 centimeters, equal to about 15.0 centimeters, equal to between 1.0 centimeter and 20.0 centimeters, equal to between about 1.0 centimeter and about 20.0 centimeters, equal to between 10.0 centimeters and 15.0 centimeters, and equal to between about 10.0 centimeters and about 15.0 centimeters.

While the first end 38 of the inner body 14 has been illustrated as having a curved leaded edge, the first end of an inner body can have any structural configuration, and skilled artisans will be able to select a suitable structural configuration for the first end of an inner body according to a particular embodiment based on various considerations, including the desired effect the first end has on fluid during use. Example alternative structural arrangements considered suitable for the first end of an inner body include rounded, flat, pointed, tapered, and any other structural arrangement considered suitable for a particular embodiment.

The mirror 16 is attached to the second end 40 of the inner body 14. The mirror can be formed of any material capable of reflecting images on the surface of the mirror 16 and can comprise any suitable shape (e.g., flat, concave, convex). The mirror 16 can be attached to the second end 40 of the inner body 14 using any suitable method of attachment, and skilled artisans will be able to select a suitable method to attach a mirror to the inner body of a low drag low noise device according to a particular embodiment based on various considerations, including the material(s) that forms the mirror and/or the inner body. Example methods of attachment considered suitable between a mirror and an inner body include using adhesives, mechanical attachment devices, and any other method of attachment considered suitable for a particular embodiment.

In the illustrated embodiment, the mirror 16 is attached to the second end 40 of the inner body 14 such that it is disposed on a plane that is orthogonal to the lengthwise axis 36 of the inner body 14. However, the mirror of a low drag low noise device can be disposed at other angles relative to the lengthwise axis of an inner body, or can be attached to the inner body such that the angle at which the mirror is disposed can be altered as desired.

While the outer body 12 and the inner body 14 have been illustrated as having particular structural configurations, the outer body and inner body of a low drag low noise device can have any suitable structural arrangement. Skilled artisans will be able to select a suitable structural arrangement for the outer body and inner body of a low drag low noise device according to a particular embodiment based on various considerations, including the desired reduction in drag and/or noise intended to be achieved. For example, the outer body of a low drag low noise device can comprise a first end that has an outer surface that is generally rectangular, circular, conical, or elliptical, and/or a second end that has an outer surface that is generally rectangular, circular, conical, or elliptical. While the inner body 14 has been illustrated as having a conical structural configuration, the inner body of a low drag low noise device can have any suitable structural arrangement, such as a first end and/or second end that is generally rectangular, circular, or elliptical.

Figure 9:
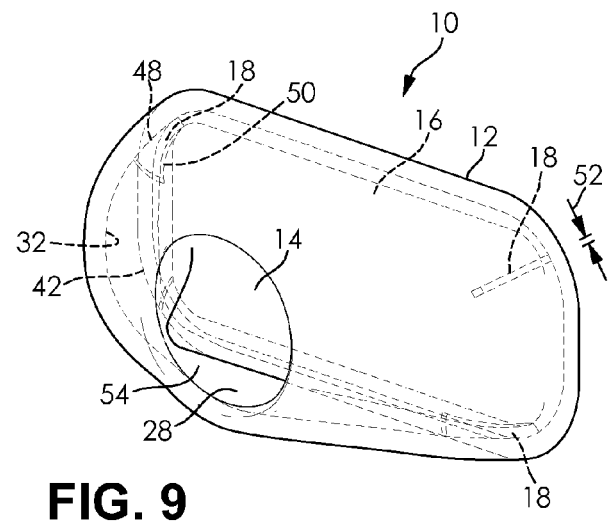
FIG. 9 is a wireframe front perspective view of the low drag low noise device illustrated in FIG. 5.
Figure 13:
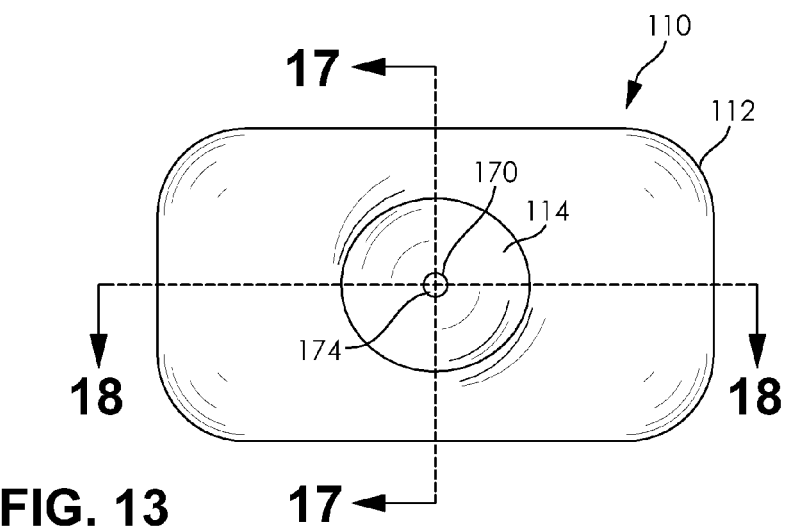
FIG. 13 is a front view of the low drag low noise device illustrated in FIG. 12.
Figure 14:
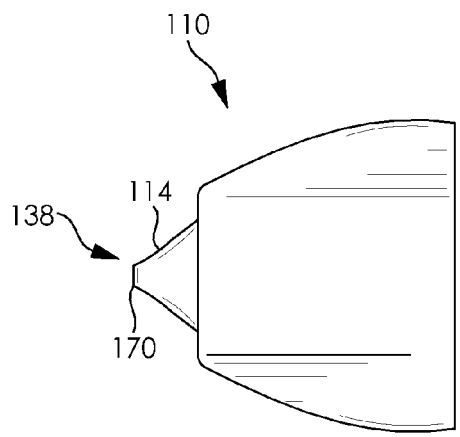
FIG. 14 is a right side view of the low drag low noise device illustrated in FIG. 12.
Figure 15:
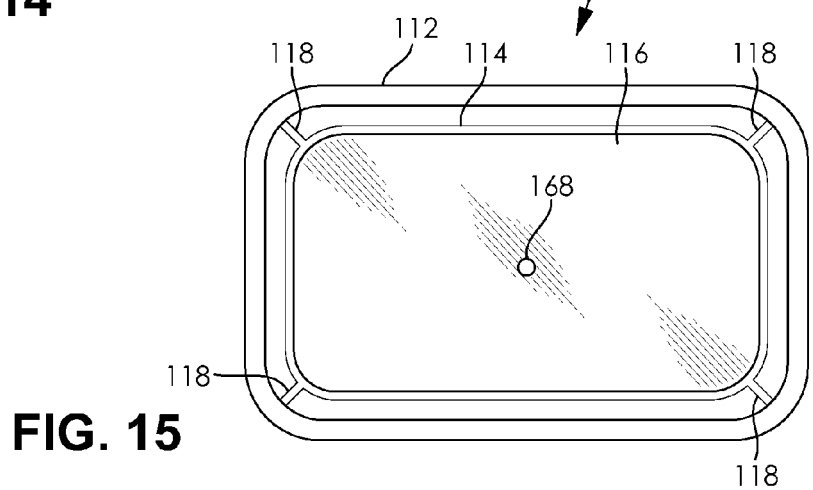
FIG. 15 is a rear view of the low drag low noise device illustrated in FIG. 12.
Figure 16:
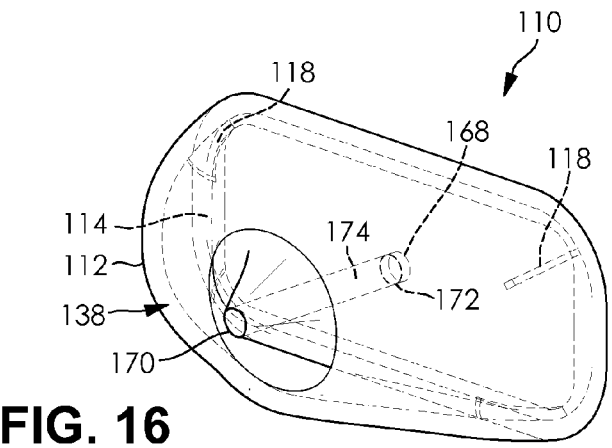
FIG. 16 is a wireframe front perspective view of low drag low noise device illustrated in FIG. 12.

Each connection fin of the plurality of connection fins 18 has a first end 48, a second end 50, and a thickness 52. As best illustrated in FIG. 9, the first end 48 of each connection fin of the plurality of connection fins 18 is attached to the inner surface 32 of the outer body 12 and the second end 50 is attached to the outer surface 42 of the inner body 14. In the illustrated embodiment, a connection fin of the plurality of connection fins 18 is disposed in each corner of the generally rectangular shaped inner surface 32 of outer body 12. The thickness 52 of each connection fin of the plurality of connection fins 18 is less than the second thickness 33" of the outer body 12. This structural arrangement provides a mechanism to minimize the impact each connection fin of the plurality of fins 18 has on the shape and direction of fluid that is intended to flow between the outer body 12 and the inner body 14, as described in more detail herein.

Each connection fin of the plurality of connection fins 18 can be attached to the outer body 12 and the inner body 14 using any suitable method of attachment. Skilled artisans will be able to select a suitable method of attachment between a connection fin and an outer body and/or inner body according to a particular embodiment based on various considerations, including the material(s) that forms the connection fin, the outer body, and/or the inner body. Example methods of attachment considered suitable include using adhesives, mechanical connectors, and/or forming the outer body, inner body, and each connection as an integral component.

While each fin of the plurality of connection fins 18 has been illustrated as disposed at a particular location between the outer body 12 and the inner body 14, a connection fin can be disposed at any suitable location between the outer body and the inner body of a low drag low noise device. Skilled artisans will be able to select a suitable position for a connection fin according to a particular embodiment based on various considerations, including the structural configuration between the outer body and the inner body.

While each fin of the plurality of fins 18 has been illustrated as having an elongated structural configuration, a fin can have any suitable structural configuration, and skilled artisans will be able to select a suitable structural configuration for a fin according to a particular embodiment based on various considerations, including the desired velocity and angle at which fluid is intended to flow through a low drag low noise device. For example, a fin can be formed such that it is circular (e.g., screw), elliptical, or such that it defines an airfoil oriented toward the first or second end of the outer body.

While the low drag low noise device 10 has been illustrated as including a plurality of connection fins 18, a low drag low noise device can include any suitable number of connection fins. Skilled artisans will be able to select a suitable number of connection fins to include on a low drag low noise device according to a particular embodiment based on various considerations, including the desired velocity and angle at which fluid is intended to flow through the low drag low noise device. Example number of connection fins considered suitable to include in a low drag low noise device include, one, at least one, two, a plurality, three, four, five, and any other number considered suitable for a particular embodiment.

While the inner body 14 has been illustrated as attached to the outer body 12 using a plurality of connection fins 18, the inner body of a low drag low noise device can be attached to the outer body of the low drag low noise device using any suitable method of attachment. Skilled artisans will be able to select a suitable method of attachment between the inner body and outer body of a low drag low noise device according to a particular embodiment based on various considerations, including the material(s) that forms the inner body and/or outer body.

In the illustrated embodiment, the inner surface 32 of the outer body 12 and the outer surface 42 of the inner body 14 cooperatively define a channel 54 within the passageway 34 defined by the outer body 12. The channel 54 extends along the entire length 27 of the outer body 12 and is unobstructed along its length, except for the plurality of connection fins 18. Alternatively, when an inner body is entirely disposed within the passageway defined by an outer body, the channel can extend along a portion of the length of an outer body. The channel 54 has a first end 54' and a second end 54". During use, fluid enters the channel 54 at the first end 54' and exits the channel 54 at the second end 54". The inner surface 32 of the outer body 12 and the outer surface 42 of the inner body 14 define the channel 54 about the entire circumference of the outer surface 42 of the inner body 14. Alternatively, a channel can be defined about a portion of the circumference of the outer surface of an inner body.

As best illustrated in FIG. 11, the channel 54 has a first cross-sectional area 56 disposed on a first plane 57 that is disposed orthogonal to the lengthwise axis 11 of the low drag low noise device 10. The first plane 57 is disposed between the first end 38 and the second end 40 of the inner body 14. The channel 54 has a second cross-sectional area 58 disposed on a second plane 59 that is disposed orthogonal to the lengthwise axis 11 of the low drag low noise device 10. The second plane 59 is disposed between the first plane 57 and the second end 40 of the inner body 14. The first cross-sectional area 56 is greater than the second cross-sectional area 58. Thus, the inner surface 32 of the outer body 12 and the outer surface 42 of the inner body 14 converge from the first end 38 of the inner body 14 to the second end 40 of the inner body 14. By reducing the cross-sectional area of the channel 54 from the first end 38 of the inner body 14 to the second end 40 of the inner body 14, fluid accelerates as it is passed through the channel 54 and exits the low drag low noise device 10 at a velocity that is greater than the velocity at which it entered the low drag low noise device 10.

Any suitable ratio between the first cross-sectional area 56 and second cross-sectional area 58 can be used to form a low drag low noise device 10, and skilled artisans will be able to select a suitable ratio between the first-cross sectional area and the second cross-sectional area according to a particular embodiment based on various considerations, including the desired amount of acceleration intended to be applied to a fluid that travels through the channel of the low drag low noise device. Example ratios considered suitable between the first cross-sectional area 56 and the second cross-sectional area 58 include ratios equal to equal to 1.0, equal to about 1.0, equal to 1.1, equal to about 1.1, equal to 2.0, equal to about 2.0, equal to 3.0, equal to about 3.0, equal to 8.0, equal to about 8.0, equal to 10.0, equal to about 10.0, equal to between 1.0 and 10, and equal to between about 1.0 and about 10.

In the illustrated embodiment, the distance between the inner surface 32 of the outer body 12 and the outer surface 42 of the inner body 14 is constant about the circumference of the inner body 14 and can comprise any suitable distance. Example distances considered suitable for a low drag low noise device, such as a side view mirror, include distances equal to 1.0 millimeter, equal to about 1.0 millimeter, equal to 4.0 millimeters, equal to about 4.0 millimeters, equal to between 1.0 millimeter to 4.0 millimeters, and equal to about 1.0 millimeter to about 4.0 millimeters.

While the distance between the inner surface 32 of the outer body 12 and the outer surface 42 of the inner body 14 has been illustrated as constant at the first end 22 of the outer body 12 and the second end 24 of the outer body 12, the distance between the inner surface of an outer body and the inner surface of an inner body can vary about the circumference of the inner body. For example, the inner surface of an outer body can be disposed both a first distance and second distance from the outer surface of an inner body on a plane that is orthogonal to the lengthwise axis of a low drag low noise device. The first distance can be the same as, or different than, the second distance.

The inner surface 32 of the outer body 12 and the outer surface 42 of the inner body 14 are configured to allow a fluid (e.g., air) to pass through the channel 54 from the first end 22 of the outer body 12 to the second end 24 of the outer body 12 such that the fluid exits the channel 54 at the second end 24 of the outer body 12 at an angle 60. The angle 60 is directed toward the lengthwise axis 11 of the low drag low noise device 10 and away from the second end 24 of the inner body 14. Alternatively, the angle 60 can be directed toward an axis that is parallel to the freestream flow of fluid through which the low drag low noise device 10 is traveling and that extends through a portion of the inner body 14 and/or a portion of the mirror 16 of the low drag low noise device 10. Angle 60 is measured relative to an axis that contains the second end 24 of the outer body 12 and that is parallel to the lengthwise axis 11 of the low drag low noise device 10. Alternatively, the angle 60 can be measured relative to an axis that contains the second end 24 of the outer body 12 and that is parallel to the freestream flow of fluid through which the low drag low noise device 10 is traveling. While angle 60 has been illustrated as constant about the circumference of the second end 40 of the inner body 14, angle 60 can alternatively vary about the circumference of the second end 40 of inner body 14. For example, fluid can exit the channel defined by a low drag low noise device at a first angle and a second angle at the second end of channel. The first angle can be different from, or the same as, the second angle and can comprise any suitable angle, such as those described herein with respect to angle 60.

Angle 60 can comprise any suitable angle, and skilled artisans will be able to select a suitable angle to direct fluid as it exits a low drag low noise device according to a particular embodiment based on various considerations, including the desired pressure and/or vortex shedding intended to be achieved. In the illustrated embodiment, angle 60 is equal to 25 degrees. Other angles considered suitable include angles equal to 0 degrees, equal to about 0 degrees, equal to 5 degrees, equal to about 5 degrees, equal to 45 degrees, equal to about 45 degrees, equal to 50 degrees, equal to about 50 degrees, equal to between 0 degrees and 50 degrees, equal to between about 0 degrees and about 50 degrees, equal to between 5 degrees and 50 degrees, and equal to between about 5 degrees and about 50 degrees.

In the illustrated embodiment, at the second end 24 of the outer body 12, the inner surface 32 curves toward the lengthwise axis 11 of the low drag low noise device 10. At the second end 40 of the inner body 14, the outer surface 42 curves toward the lengthwise axis 11 of the low drag low noise device 10.

As best illustrated in FIG. 11A, the inner surface 32 of the outer body 12 has an inner surface section 61 that extends from a first end 61' to a second end 61''. The first end 61' is disposed between the first end 22 and second end 24 of the outer body 12. The second end 61'' of the inner surface section 61 is disposed between the first end 61' of the inner surface section 61 and the second end 24 of the outer body 12. The inner surface section 61 extends toward the lengthwise axis 11 of the low drag low noise device 10 from the first end 61' to the second end 61'' at an angle 61'''. Alternatively, the inner surface section 61 can extend at an angle 61''' toward an axis that is parallel to the freestream flow of fluid through which the low drag low noise device 10 is travelling and that extends through a portion of the inner body 14 and/or a portion of the mirror 16 of the low drag low noise device 10. Angle 61''' can comprise any suitable angle, such as those described herein relative to angle 60. Angle 61''' is measured relative to an axis that contains the second end 24 of the outer body 12 and is parallel to the lengthwise axis 11 of the low drag low noise device 10. Alternatively, angle 61''' can be measured relative to an axis that contains the second end 24 of the outer body 12 and that is parallel to the freestream flow of fluid through which the low drag low noise device 10 is travelling. While angle 61''' has been illustrated as constant about the circumference of the inner surface 32 of the outer body 12, angle 61''' can alternatively vary about the circumference of the inner surface 32 of the outer body 12. For example, a first section of the inner surface of the outer body 12 can be defined at a first angle, such as those described herein, and a second section of the inner surface of the outer body 12 can be defined at a second angle, such as those described herein. The first angle can be different from, or the same as, the second angle.

As best illustrated in FIG. 11A, the outer surface 42 of the inner body 14 has an outer surface section 62 that extends from a first end 62' to a second end 62''. The first end 62' is disposed between the first end 38 and second end 40 of the inner body 14. The second end 62'' of the outer surface section 62 is disposed between the first end 62' of the outer surface section 62 and the second end 40 of the inner body 14. The outer surface section 62 extends toward the lengthwise axis 11 of the low drag low noise device 10 from the first end 62' to the second end 62'' at an angle 62'''. Alternatively, the outer surface section 62 can extend at an angle 62''' toward an axis that is parallel to the freestream flow of fluid through which the low drag low noise device 10 is travelling and that extends through a portion of the inner body 14 and/or a portion of the mirror 16 of the low drag low noise device 10. Angle 62''' can comprise any suitable angle, such as those described herein relative to angle 60. Angle 62''' is measured relative to an axis that contains the second end 40 of the inner body 14 and is parallel to the lengthwise axis 11 of the low drag low noise device 10. Alternatively, angle 62''' can be measured relative to an axis that contains the second end 40 of the inner body 14 and that is parallel to the freestream flow of fluid through which the low drag low noise device 10 is travelling. While angle 62''' has been illustrated as constant about the circumference of the outer surface 42 of the inner body 14, angle 62''' can alternatively vary about the circumference of the outer surface 42 of the inner body 14. For example, a first section of the outer surface of the inner body 14 can be defined at a first angle, such as those described herein, and a second section of the outer surface of the inner body 14 can be defined at a second angle, such as those described herein. The first angle can be different from, or the same as, the second angle.

Alternative to both the inner surface 32 of the outer body 12 and the outer surface 42 of the inner body 14 extending toward the lengthwise axis 11 of the low drag low noise device 10, or an axis that is parallel to the freestream flow through which the low drag low noise device 10 is travelling, one of the inner surface 32 of the outer body 12 or the outer surface 42 inner body 14 can extend toward the lengthwise axis 11 of the low drag low noise device 10, or the axis that is parallel to the freestream flow through which the low drag low noise device 10 is travelling. While angle 61''' and angle 62''' have been illustrated as equal to one another, angle 61''' and angle 62''' can be different from one another and can comprise any suitable angle, such as those described herein with respect to angle 60.

Figure 19:
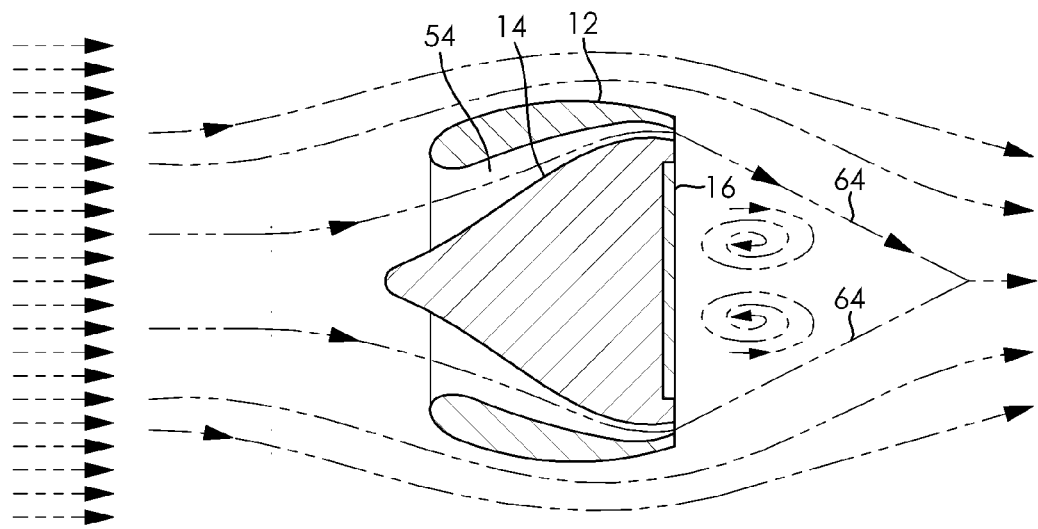
FIG. 19 depicts the low drag low noise device illustrated in FIG. 10 subjected to a flow field.

During travel, the channel 54 directs the flow of fluid (e.g., air) through the low drag low noise device 10 to accomplish a reduction in noise and drag relative to a device that does not define a channel through the device. During use, fluid enters the low drag low noise device 10 through the first opening 28 of the outer body 12 and is directed through channel 54 between the outer body 12 and the inner body 14 and exits through the second opening 30 defined by the outer body 12 as a jet of fluid 64. The jet of fluid 64 travels at a specific velocity and at angle 60. This is best shown in FIGS. 10 and 11. Based on angle 60, the noise level and drag is reduced as a result of jet of fluid 64 altering the base flow relative to a device that does not include a channel. In addition, as a result of the jet of fluid 64 converging toward the lengthwise axis 11 of the low drag low noise device 10 a smooth virtual trailing edge, or boat-tail, is created, as illustrated in FIG. 19. This smooth trailing edge, or boat-tail, prevents or reduces vortex shedding and increases base pressure relative to devices that do not include a channel, such as those illustrated in FIGS. 1 through 4. By reducing vortex shedding and increasing the base pressure, the noise and drag produced by the low drag low noise device 10 is reduced relative to devices that do not include a channel, such as those illustrated in FIGS. 1 through 4.

The angle and velocity at which the jet of fluid 64 exits the channel 54 will be based on a number of characteristics, such as the structural arrangement of the outer surface 26 of the outer body 12, the structural arrangement between the outer body 12 and the inner body 14 at the first end 22 and second end 24 of the outer body 12, the structural arrangement between the outer body 12 and the inner body 14 along channel 54, the first cross-sectional area 56, and/or the second cross-sectional area 58. It is to be understood that the above characteristics of the low drag low noise device 10 may be modified within the scope of the present disclosure in the interest of obtaining the optimum exit angle and velocity which results in the greatest reduction in noise and/or drag.

FIGS. 12, 13, 14, 15, 16, 17, and 18 illustrate another low drag low noise device 110. Low drag low noise device 110 is similar to the low drag low noise device 10 illustrated in FIGS. 5, 6, 7, 8, 9, 10, 11 and 11A and described above, except as detailed below. Reference numbers in FIGS. 12, 13, 14, 15, 16, 17, and 18 refer to the same structural element or feature referenced by the same number in FIGS. 5, 6, 7, 8, 9, 10, 11 and 11A, offset by 100. Thus, low drag low noise device 110 comprises an outer body 112, an inner body 114, a mirror 116, and a plurality of connection fins 118.

In the embodiment illustrated in FIGS. 12, 13, 14, 15, 16, 17, and 18, the mirror 116 defines a passageway 168 that extends through the thickness of the mirror 116. In addition, the inner body 114 defines a first opening 170, a second opening 172, and a passageway 174. The first opening 170 is defined on the first end 138 of the inner body 114. The second opening 172 is defined on the second end 140 of the inner body 114. The passageway 174 extends from the first opening 170 to the second opening 172 and traverses the length 141 of the inner body 114. The second opening 172 defined by the inner body 114 is in communication with the passageway 168 defined by the mirror 116.

In the illustrated embodiment, the passageway 168 defined by the mirror 116 and the passageway 174 defined by the inner body 114 have the same diameter and the diameter of passageway 174 is constant along its length. It is to be noted, however, that in alternative embodiments the diameter of passageway 168 and the diameter of passageway 174 can be different than one another. In addition, alternative embodiments can include a passageway 174 that converges, or diverges, from the first end 138 of the inner body 114 to the second end 140 of the inner body 144.

The passageway 168 defined by the mirror 116 and the passageway 174 defined by the inner body 114 can have any suitable diameter. Skilled artisans will be able to select a suitable diameter for a passageway defined by a mirror and a passageway defined by an inner body, according to a particular embodiment based on various considerations, including the desired flow characteristics intended to be achieved at the second end of the inner body. Example diameters considered suitable for a passageway defined by a mirror and/or a passageway defined by an inner body include diameters equal to 3.0 millimeters, equal to about 3.0 millimeters, equal to 5.0 millimeters, equal to about 5.0 millimeters, equal to between 1.0 millimeter and 7.0 millimeters, equal to between about 1.0 millimeter and about 7.0 millimeters, equal to between 3.0 millimeters and 5.0 millimeters, and equal to between about 3.0 millimeters and about 5.0 millimeters.

While the passageway 174 has been illustrated as having a circular cross-sectional configuration, the passageway defined by the inner body of a low drag low noise device can have any structural configuration. Skilled artisans will be able to select a suitable structural configuration for the passageway defined by an inner body according to a particular embodiment based on various considerations, including the desired volume of fluid intended to be passed through the passageway. Example cross-sectional configurations considered suitable for the passageway defined by an inner body include rectangular, square, triangular, circular, elliptical, oval, and any other cross-sectional configuration considered suitable for a particular embodiment.

While the passageway 174 has been illustrated as extending from a first opening 170 to a second opening 172, a passageway defined by the inner body of a low drag low noise device can extend from one or more openings on the first end of the inner body to one or more openings on the second end of the inner body. For example, the passageway can extend from a first opening on the first end of the inner body to a plurality of openings defined on the second end of the inner body that are in communication with a plurality of passageways defined by the mirror. The plurality of openings defined by the mirror and the second end of the inner body can optionally be distributed in a grid format. This configuration provides a mechanism for reducing the amount of viewing obstruction created on the mirror relative to an embodiment that includes a single opening defined on the mirror.

Figure 17:
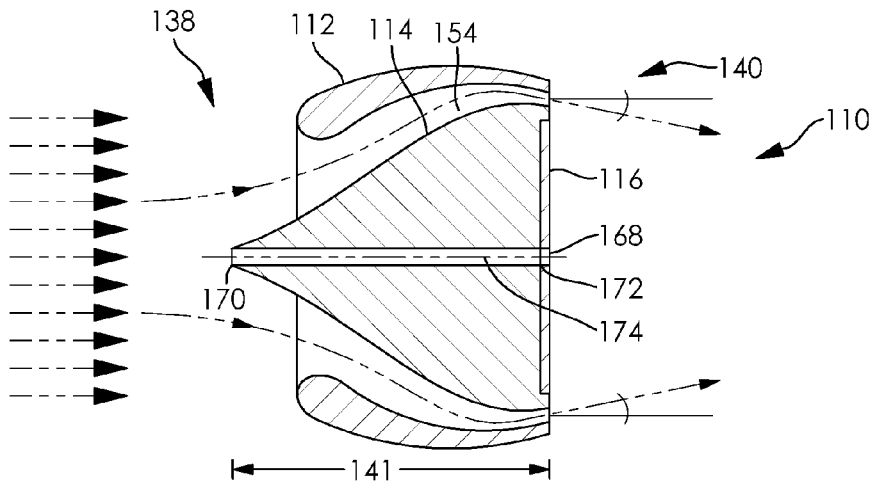
FIG. 17 is a sectional view of the low drag low noise device illustrated in FIG. 13, taken along line 17-17.
Figure 18:
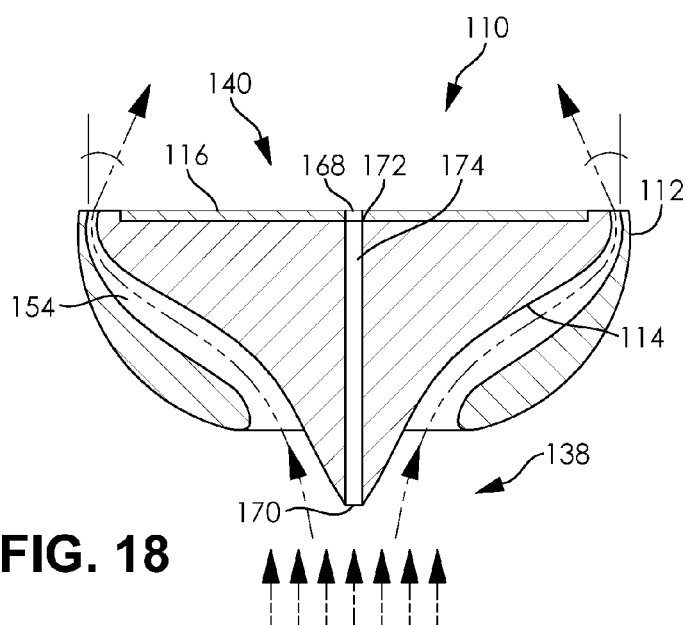
FIG. 18 is a sectional view of the low drag low noise device illustrated in FIG. 13, taken along line 18-18.

As illustrated in FIGS. 17 and 18, in addition to fluid travelling through channel 154, fluid will travel through passageway 168 defined by the mirror 116 and passageway 174 defined by the inner body 114. This configuration provides a mechanism for reducing the stagnation pressure at the front of the low drag low noise device 110 and increases the base pressure at the rear of the low drag low noise device 110 relative to a device that does not include a passageway defined by the inner body. Reducing the stagnation pressure and increasing the base pressure reduces the pressure differential found when comparing the pressure of the fluid (e.g., air) at the front of the low drag low noise device 110 to the pressure of the fluid (e.g., air) at the rear of the low drag low noise device 110. With the pressure differential between the front and the rear of the low drag low noise device 110 reduced, the magnitude of pressure drag forces that the low drag low noise device 110 is subjected to is also reduced relative to a device that does not include a passageway defined by the inner body.

Figure 20:
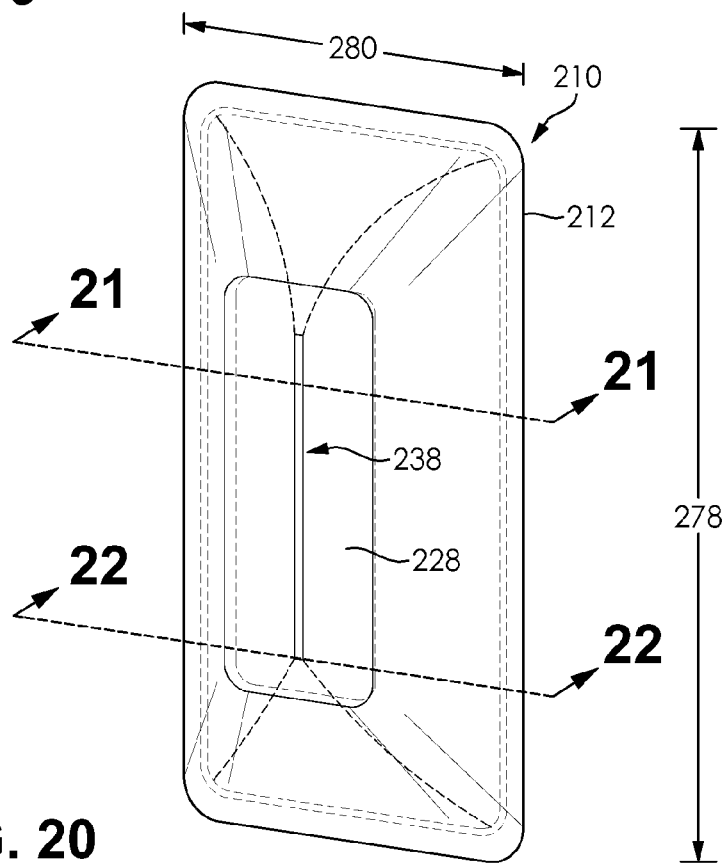
FIG. 20 is a front perspective view of another low drag low noise device.
Figure 21:
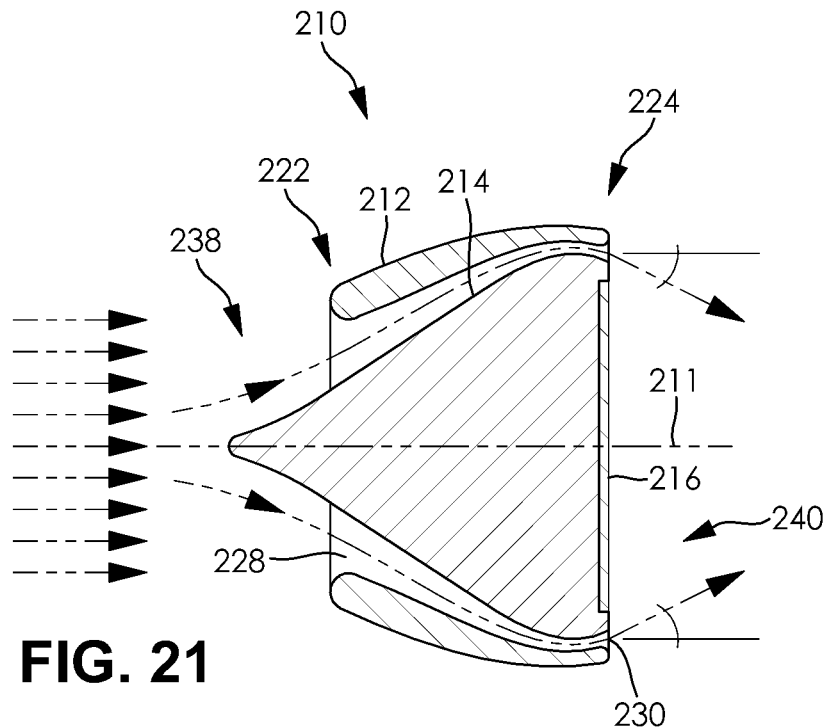
FIG. 21 is a sectional view of the low drag low noise device illustrated in FIG. 20, taken along line 21-21.
Figure 22:
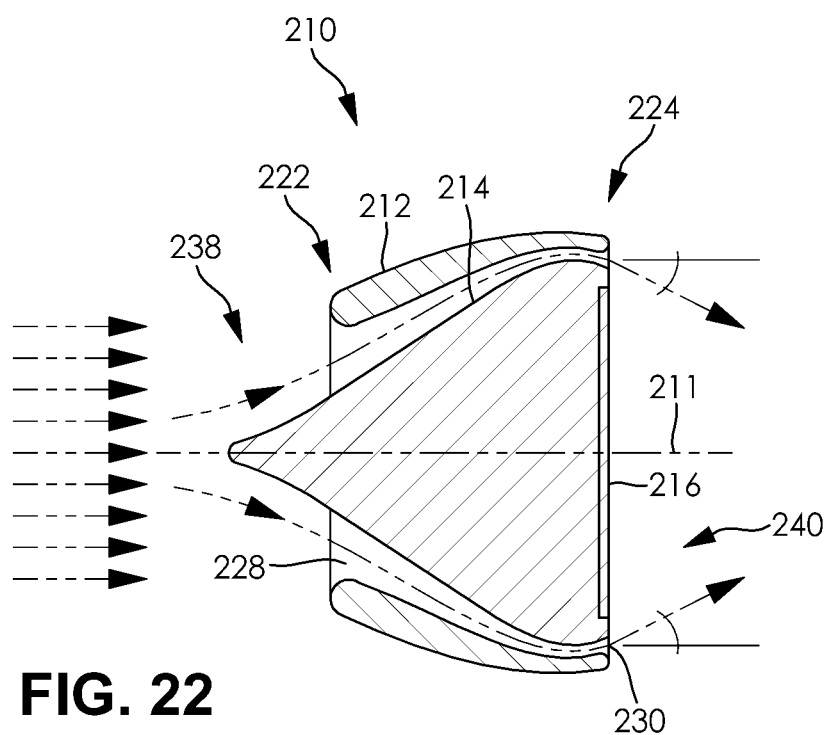
FIG. 22 is a sectional view of the low drag low noise device illustrated in FIG. 20, taken along line 22-22.

FIGS. 20, 21, and 22 illustrate another low drag low noise device 210. Low drag low noise device 210 is similar to the low drag low noise device 10 illustrated in FIGS. 5, 6, 7, 8, 9, 10, 11 and 11A and described above, except as detailed below. Reference numbers in FIGS. 20, 21, and 22 refer to the same structural element or feature referenced by the same number in FIGS. 5, 6, 7, 8, 9, 10, 11 and 11A, offset by 200. Thus, low drag low noise device 210 comprises an outer body 212, an inner body 214, a mirror 216, and a plurality of connection fins (not shown).

In the embodiment illustrated in FIGS. 20, 21, and 22, each of the first end 222 of the outer body 212, the second end 224 of the outer body 212, the first opening 228 defined by the outer body 212, the second opening 230 defined by the outer body 212, the first end 238 of the inner body 214, and the second end 240 of the inner body 214 comprises a generally rectangular configuration. In addition, the outer body 212 has a height 278 and a width 280.

The height 278 is measured on a plane that is orthogonal to the lengthwise axis 211 of the low drag low noise device 210. The width 280 is measured on a plane that is orthogonal to the lengthwise axis 211 of the low drag low noise device 210. The height 278 is greater than the width 280 providing an elongated low drag low noise device 210.

Figure 23:
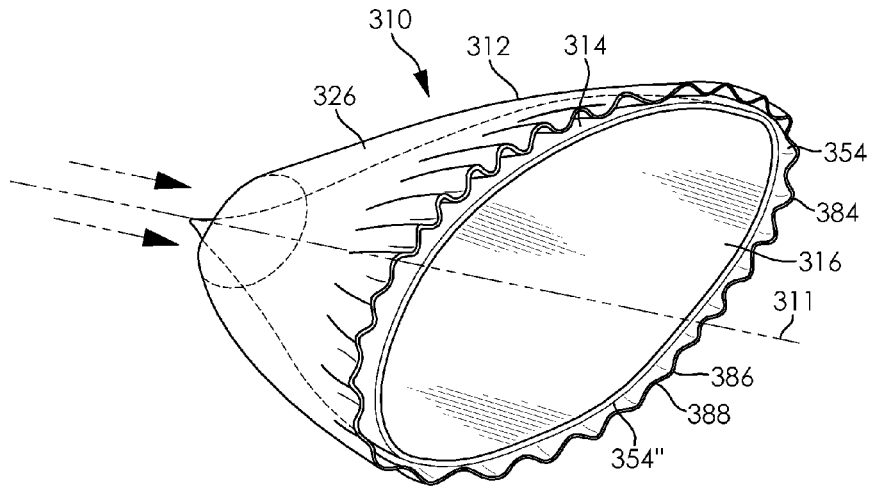
FIG. 23 is a rear perspective view of another low drag low noise device.
Figure 24:
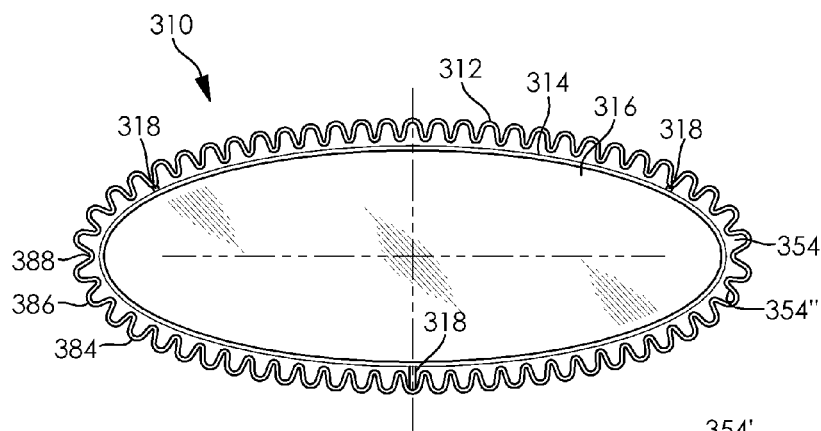
FIG. 24 is a rear view of the low drag low noise device illustrated in FIG. 23.
Figure 25:
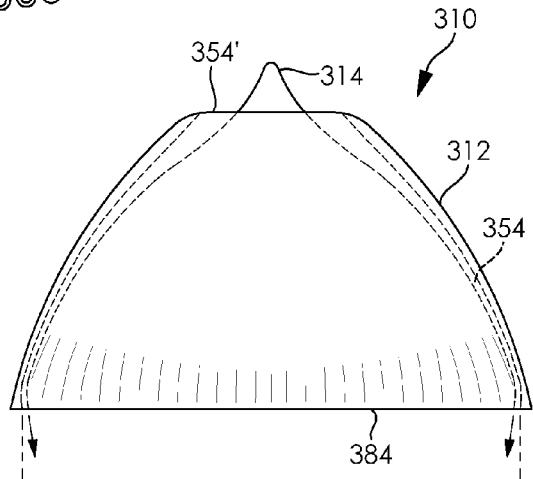
FIG. 25 is a top view of the low drag low noise device illustrated in FIG. 23.

FIGS. 23, 24, and 25 illustrate another low drag low noise device 310. Low drag low noise device 310 is similar to the low drag low noise device 10 illustrated in FIGS. 5, 6, 7, 8, 9, 10, 11, and 11A and described above, except as detailed below. Reference numbers in FIGS. 23, 24, and 25 refer to the same structural element or feature referenced by the same number in FIGS. 5, 6, 7, 8, 9, 10, 11, and 11A, offset by 300. Thus, low drag low noise device 310 comprises an outer body 312, an inner body 314, a mirror 316, and a plurality of connection fins 318.

In the embodiment illustrated in FIGS. 23, 24, and 25, the second end 324 of the outer body 312 defines a sinusoidal edge 384 and a portion of the outer surface 326 has a waved configuration that corresponds to the to the sinusoidal edge 384. Sinusoidal edge 384 is defined along a plane that is orthogonal to the lengthwise axis 311 of the low drag low noise device 310. The sinusoidal edge 384 comprises a plurality of peaks 386 and troughs 388 and can comprise any suitable amplitude and frequency. This is illustrated best in FIG. 24. This structural arrangement provides a mechanism for enhancing the mixture of fluid that passes over the outer surface 326 of the outer body 312 and that travels through channel 354.

While the second end 324 of the outer body 312 has been described as having a sinusoidal edge 384, the second end of the outer body of a low drag low noise device can define any suitable structural configuration. Skilled artisans will be able to select a suitable structural configuration for the second end of an outer body according to a particular embodiment based on various considerations, including the flow characteristics intended to be achieve. Example structural configurations considered suitable include curved, wavy, angled, sinusoidal, and any other structural configuration considered suitable for a particular embodiment.

While the second end 324 of the outer body 312 and a portion of the outer surface 326 of the outer body 312 have been illustrated as having a particular structural arrangement, the outer body of a low drag low noise device can have any suitable structural arrangement. Skilled artisans will be able to select a suitable structural arrangement for the outer body of a low drag low noise device according to a particular embodiment based on various considerations, including the flow characteristics intended to be achieved. For example, while FIGS. 23, 24, and 25 illustrate a portion of the outer surface 326 of the outer body 312 having a waved configuration that corresponds to the to the sinusoidal edge 384, the outer surface of an outer body can define a sinusoidal configuration, or waved configuration, that corresponds to the sinusoidal edge defined by the outer body.

The first end 354' and second end 354" of channel 354 can comprise any suitable cross-sectional area, and skilled artisans will be able to select a suitable cross-sectional area for the first end and second end of a channel according to a particular embodiment based on various considerations, including the desired flow characteristics intended to be achieved at the first end and/or second end of the channel. Example ratios considered suitable between a first cross-sectional area at the first end of a channel (e.g., disposed on a first plane that is orthogonal to the lengthwise axis of a low drag low noise device) and a second cross-sectional area at the second end of a channel (e.g., disposed on a second plane that is orthogonal to the lengthwise axis of the low drag low noise device and parallel to the first plane) include ratios equal to equal to 1.0, equal to about 1.0, equal to 1.1, equal to about 1.1, equal to 2.0, equal to about 2.0, equal to 3.0, equal to about 3.0, equal to 8.0, equal to about 8.0, equal to 10.0, equal to about 10.0, equal to between 1.0 and 10, and equal to between about 1.0 and about 10.

Figure 26:
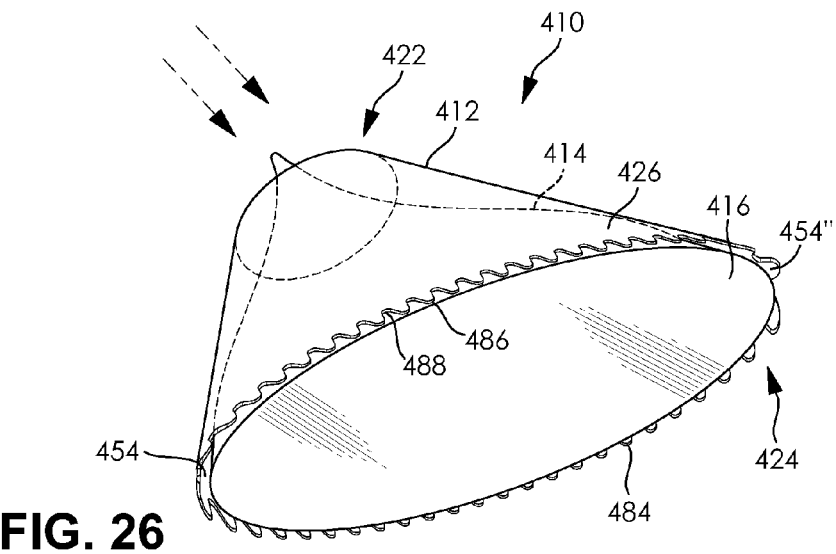
FIG. 26 is a rear perspective view of another low drag low noise device.
Figure 27:
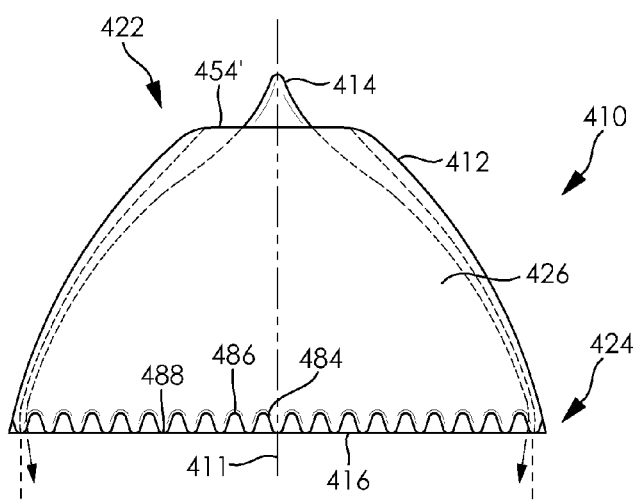
FIG. 27 is a top view of the low drag low noise device illustrated in FIG. 25.
Figure 28:
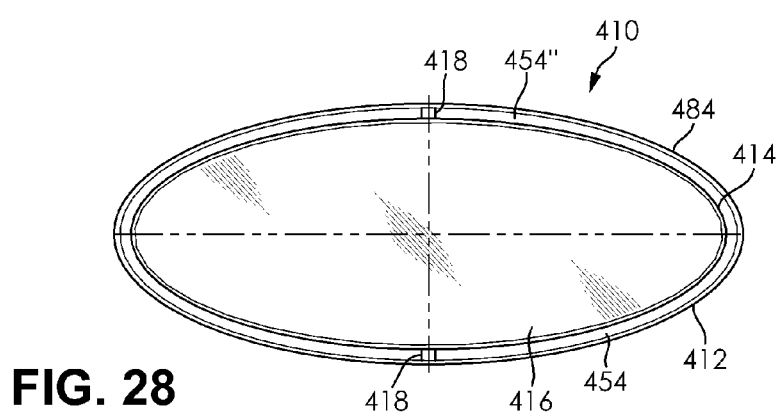
FIG. 28 is a rear view of the low drag low noise device illustrated in FIG. 25.

FIGS. 26, 27, and 28 illustrate another low drag low noise device 410. Low drag low noise device 410 is similar to the low drag low noise device 10 illustrated in FIGS. 5, 6, 7, 8, 9, 10, 11, and 11A and described above, except as detailed below. Reference numbers in FIGS. 26, 27, and 28 refer to the same structural element or feature referenced by the same number in FIGS. 5, 6, 7, 8, 9, 10, 11, and 11A, offset by 400. Thus, low drag low noise device 410 comprises an outer body 412, an inner body 414, a mirror 416, and a plurality of connection fins 418.

In the embodiment illustrated in FIGS. 26, 27, and 28, the second end 424 of the outer body 412 defines a sinusoidal edge 484 along the length of the outer body 412. The sinusoidal edge 484 comprises a plurality of peaks 486 and troughs 488, as best illustrated in FIG. 27. The sinusoidal edge 484 can comprise any suitable amplitude and frequency. The peaks 486 are disposed at the second end 424 of the outer body 412 and the troughs 488 are disposed between the first end 422 and the second end 424 of the outer body 412. This structural arrangement provides a mechanism for enhancing the mixture of fluid that passes over the outer surface 426 of the outer body 412 and that travels through passageway 454.

While the second end 424 of the outer body 412 has been described as having a sinusoidal edge 484, the second end of the outer body of a low drag low noise device can define any suitable structural configuration. Skilled artisans will be able to select a suitable structural configuration for the second end of an outer body according to a particular embodiment based on various considerations, including the flow characteristics intended to be achieve. Example structural configurations considered suitable include curved, wavy, angled, sinusoidal, and any other structural configuration considered suitable for a particular embodiment.

The sinusoidal edge 484 can comprise any suitable amplitude (e.g., peak to peak amplitude) and frequency. Skilled artisans will be able to select a suitable amplitude and frequency to define the second end of an outer body according to a particular embodiment based on various considerations, including the desired flow characteristics intended to be achieved at the second end of a channel. Example amplitudes (e.g., peak to peak) considered suitable for the edge of the second end of an outer body include amplitudes equal to 1 time to 4 times the distance between the inner surface of the outer body and the outer surface of an inner body along a plane that is disposed orthogonal to the lengthwise axis of the low drag low noise device (e.g., at the second end of the inner body), amplitudes substantially equal to 1 time to 4 times the distance between the inner surface of the outer body and the outer surface of an inner body along a plane that is disposed orthogonal to the lengthwise axis of the low drag low noise device (e.g., at the second end of the inner body), and amplitudes equal to about 1 time to 4 times the distance between the inner surface of the outer body and the outer surface of an inner body along a plane that is disposed orthogonal to the lengthwise axis of the low drag low noise device (e.g., at the second end of the inner body).

Figure 29:
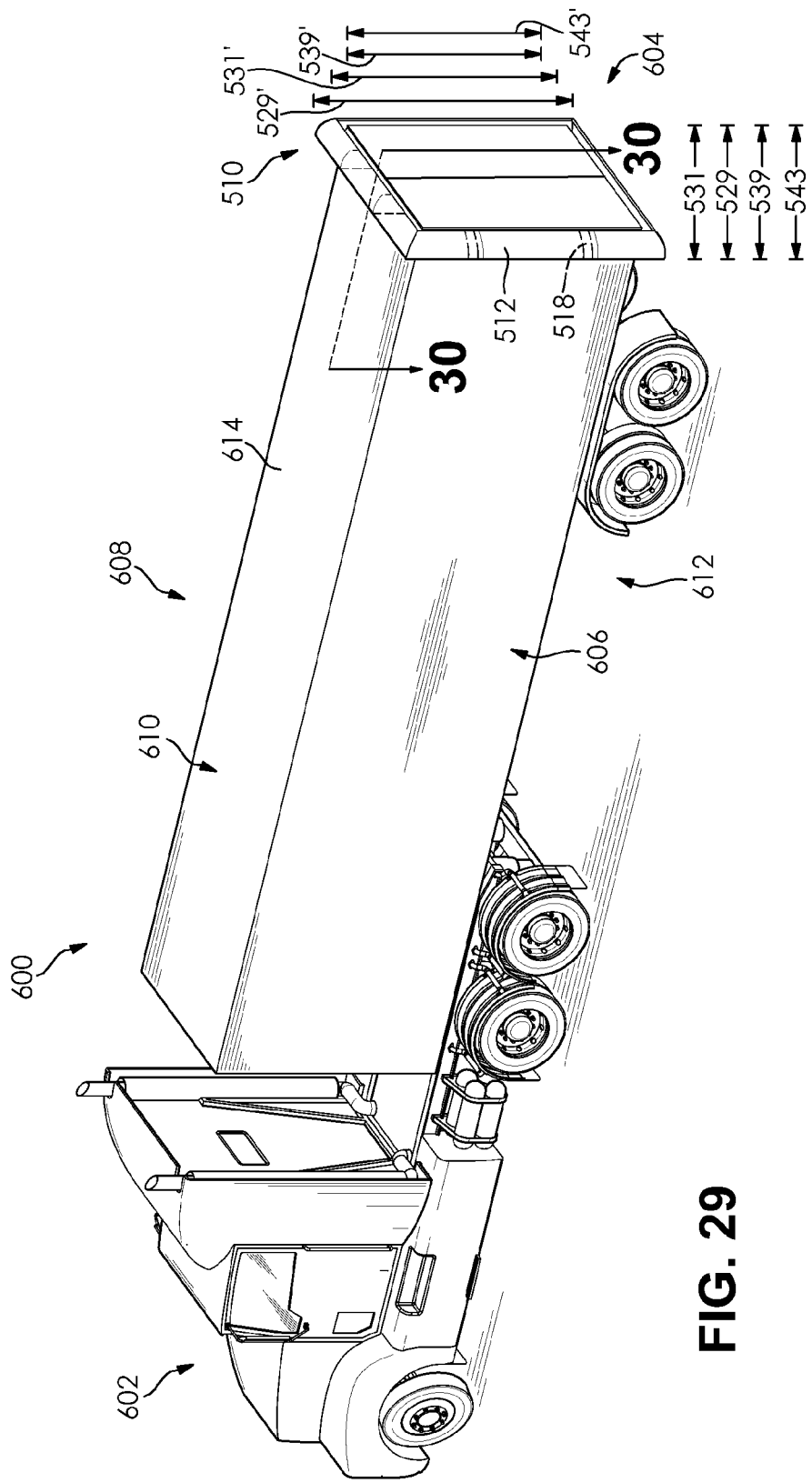
FIG. 29 is a perspective view of a motor vehicle with an attached low drag low noise device.
Figure 30:
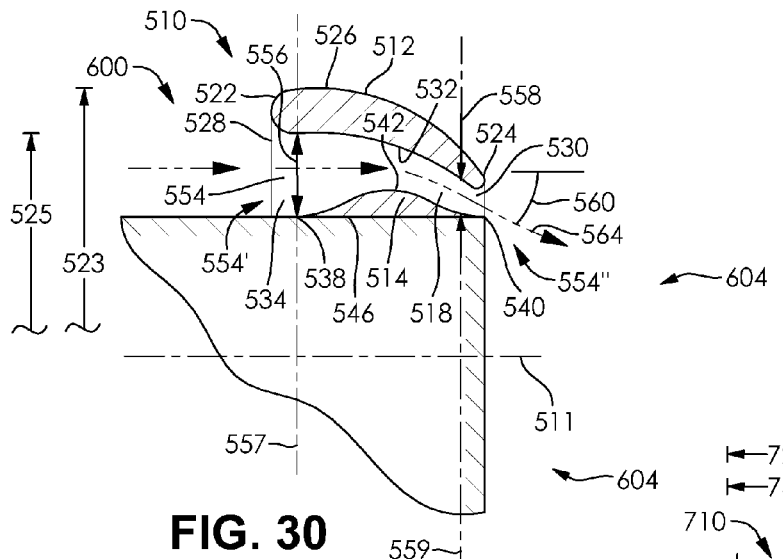
FIG. 30 is a partial sectional view of the motor vehicle and low drag low noise device illustrated in FIG. 29, taken along line 30-30.

FIGS. 29 and 30 illustrate another low drag low noise device 510 attached to a motor vehicle 600. Low drag low noise device 510 is similar to the low drag low noise device 10 illustrated in FIGS. 5, 6, 7, 8, 9, 10, 11, and 11A and described above, except as detailed below. Reference numbers in FIGS. 29 and 30 refer to the same structural element or feature referenced by the same number in FIGS. 5, 6, 7, 8, 9, 10, 11, and 11A, offset by 500. Thus, low drag low noise device 510 comprises an outer body 512, an inner body 514, and a plurality of connection fins 518.

In the illustrated embodiment, the mirror (e.g., mirror 16) has been omitted and the low drag low noise device 510 is attached to the motor vehicle 600, as described in more detail herein. The motor vehicle 600 comprises a front end 602, a rear end 604, a first side 606, a second side 608, a roof 610, and an undercarriage 612.

In the embodiment illustrated, the first end 522 of the outer body 512 comprises a generally rectangular outer surface 526 and the second end 524 of the outer body 512 comprises a generally rectangular outer surface 526. The generally rectangular outer surface 526 of the first end 522 extends to the general rectangular outer surface 526 of the second end 524 and toward the lengthwise axis 511 of the low drag low noise device 510. The first end 522 has an outside diameter 523 and the second end 524 has an outside diameter 525. The outside diameter 523 of the first end 522 is greater than the outside diameter 525 of the second end 524.

The first opening 528 is generally rectangular and is defined on the first end 522 of the outer body 512. The first opening 528 has a first diameter 529 and a second diameter 529' that is measured on a plane that is orthogonal to the lengthwise axis 511 of the low drag low noise device 510. The second opening 530 is defined on the second end 524 of the outer body 512, is a generally rectangular, and has a first diameter 531 and a second diameter 531' that is measured on a plane that is orthogonal to the lengthwise axis 511 of the low drag low noise device 10. In the embodiment illustrated in FIGS. 29 and 30, the first diameter 529 of the first opening 528 is greater than the first diameter 531 of the second opening 530 and the second diameter 529' of the first opening 528 is greater than the second diameter 531' of the second opening 530.

While the first opening 528 has been illustrated as generally rectangular and the second opening 530 has been illustrated as generally rectangular, the first opening and second opening defined by an outer body can have any suitable structural configuration, as described herein.

The inner surface 532 of the outer body 512 extends from the first opening 528 to the second opening 530 and defines the passageway 534, which extends through the outer body 512. In the illustrated embodiment, the inner surface 532 of the outer body 512 extends toward the lengthwise axis 511 of the low drag low noise device 510 from the first end 522 to the second end 524 of the outer body 512. Thus, the passageway 534 is formed such that it converges and has a length and a width that decreases from the first end 522 to the second end 524 of the outer body 512.

In the illustrated embodiment, the inner body 514 is entirely disposed within the passageway 534 defined by the outer body 512 and is attached to the outer body 512 using the plurality of connection fins 518. The inner body 514 comprises a first end 538, a second end 540, a length 541, an outer surface 542, and an inner surface 546.

The inner surface 546 of the inner body 514 is generally rectangular and is attached to the motor vehicle 600 (e.g., the trailer 614) using any suitable method or technique. The first end 538 of the inner body 514 is disposed within the passageway 534 defined by the outer body 512. The second end 540 of the inner body 514 is disposed on a plane that contains the second end 524 of the outer body 512, the rear end 604 of the motor vehicle 600, and is disposed orthogonal to the lengthwise axis 511 of the low drag low noise device 510. However, alternative embodiments could include, but are not limited to, a second end of an inner body that is not disposed on a plane that contains the second end of an outer body or the rear end of the vehicle, or that is disposed on a plane that contains the second end of an outer body or the rear end of the vehicle. The outer surface 542 of the inner body 514 extends from the first end 538, curves away from the lengthwise axis 511 of the low drag low noise device 510 along a first portion of the inner body 514, and curves toward the lengthwise axis 511 of the low drag low noise device 510 along a second portion of the inner body 514 to the second end 540. The first portion of the inner body 514 is disposed between the first end 538 and the second end 540 and the second portion of the inner body is disposed between the first portion and the second end 540 of the inner body 514.

While the inner body 514 has been illustrated as having an inner surface 546 that has a generally rectangular shape, the inner surface of an inner body can have any suitable shape. Skilled artisans will be able to select a suitable shape to configure the inner surface of an inner body according to a particular embodiment based on various considerations, including the shape and/or structural configuration of the vehicle, or component, to which the low drag low noise device is being attached. Example shapes considered suitable to form the inner surface of an inner body include, but are not limited to, generally rectangular, circular, square, elliptical, oval, oblong, and any other shape considered suitable for a particular embodiment.

The inner body 514 of low drag low noise device 510 can be attached to the motor vehicle 600 (e.g., trailer 614) using any suitable method or technique, and skilled artisans will be able to select a suitable method or technique to attach a low drag low noise device to a vehicle based on various considerations, including the material(s) that forms the low drag low noise device and/or the vehicle. Example methods and techniques considered suitable to attach a low drag low noise device to another component, such as a vehicle, include using adhesives, mechanical connections (e.g., screws, nuts, bolts), welding the low drag low noise device to the component, using one or more straps, and any other method or technique considered suitable for a particular embodiment. Optionally, the inner surface 514 can be formed as part of a vehicle (e.g., trailer).

The first end 538 of the inner body 514 has a first diameter 539 and a second diameter 539' and the second end 540 of the inner body 514 has a first diameter 543 and a second diameter 543'. The first diameter 539 and second diameter 539' of the first end 538 is measured on a plane that is disposed orthogonal to the lengthwise axis 511 of the low drag low noise device 510. The first diameter 543 and second diameter 543' of the second end 540 is measured on a plane that is disposed orthogonal to the lengthwise axis 511 of the low drag low noise device 510. The first diameter 539 of the first end 538 is equal to the first diameter 543 of the second end 540. The second diameter 539' of the first end 538 is equal to the second diameter 543' of the second end 540.

The length 541 of the inner body 514 extends from the first end 538 to the second end 540 of the inner body 514 and is measured on an axis that is parallel to the lengthwise axis 511 of the low drag low noise device 510. The length 541 of the inner body 514 is different than the length 527 of the outer body 512. In the embodiment illustrated, the length 541 of the inner body 514 is less than the length 527 of the outer body 512. Alternatively, the length of the inner body of a low drag low noise device can be greater than, or equal to, the length of the outer body of the low drag low noise device.

In the illustrated embodiment, the low drag low noise device 510 is attached to the vehicle 600 (e.g., trailer 614) between the front end 602 and rear end 604 of the vehicle 600 such that the second end 524 of the outer body 512 and the second end 540 of the inner body 514 are disposed on a plane that contains the rear end 604 of the vehicle 600 (e.g., rear end of trailer 614) and that is disposed orthogonally to the lengthwise axis 511 of the low drag low noise device 510. However, a low drag low noise device can be attached to another component, such as a trailer, or a first trailer and a second trailer, at any suitable location and angle. For example, a low drag low noise device can be attached to a component, such as a vehicle or trailer, such that the second end of the outer surface and/or the second end of the inner surface are not disposed on a plane that contains the rear end of the vehicle or trailer.

While the portion of the vehicle 600 on which the low drag low noise device 510 has been attached (e.g., trailer 614) has been illustrated as having a generally rectangular cross-sectional configuration and having a substantially planar rear end, a vehicle or trailer can have any suitable structural configuration and/or can form a portion of the outer surface of the inner body. For example, the vehicle or a trailer can form the inner body, such as those described herein, and the outer body can be attached to the inner body using any suitable structure, such as one or more connection fins. For example, a vehicle or trailer can have a cross-sectional configuration that is square, rectangular, elliptical, circular, oval, or any other shape considered suitable for a particular embodiment. For example, the rear end of a vehicle or trailer can be formed such that it is not substantially planar, such that it is curved, or forms any other suitable shape.

In the illustrated embodiment, the inner surface 532 of the outer body 512 and the outer surface 542 of the inner body 514 cooperatively define a channel 554 within the passageway 534 defined by the outer body 512. The channel 554 extends along the entire length 527 of the outer body 512 and is unobstructed along its length, except for the plurality of connection fins 518. The channel 554 has a first portion defined between the outer body 512 and the vehicle 600 (e.g., trailer 614) and a second portion defined between the outer body 512 and the inner body 514. However, alternative embodiments can include a channel that is entirely formed between the inner surface of the outer body and the outer surface of the inner body, or between the inner surface of the outer body and the outer surface of a vehicle, such as those described herein. The channel 554 has a first end 554' and a second end 554". The first end 554' of the channel 554 is disposed between the first end 538 of the inner body 514 and the second end 540 of the inner body 514. The second end 554" disposed between the first end 554' and the second end 540 of the inner body 514. During use, fluid enters the channel 554 at the first end 554' and exits the channel 554 at the second end 554". In the illustrated embodiment, the channel 554 is defined about the entire circumference of the vehicle (e.g., trailer 614), such that a first portion is defined on the first side 606, a second portion is defined on the second side 608, a third portion is defined on the roof 610, and a fourth portion is defined on the undercarriage 612. Alternatively, a channel can be defined about a portion of the circumference of motor vehicle 600, such as a trailer (e.g., on one or more of the first side 620, second side 622, roof 624, undercarriage 626).

As best illustrated in FIG. 30, the channel 554 has a first cross-sectional area 556 disposed on a first plane 557 that is disposed orthogonal to the lengthwise axis 511 of the low drag low noise device 510. The first plane 557 is disposed between the first end 538 and the second end 540 of the inner body 514. The channel 554 has a second cross-sectional area 558 disposed on a second plane 559 that is disposed orthogonal to the lengthwise axis 511 of the low drag low noise device 510. The second plane 559 is disposed between the first plane 557 and the second end 540 of the inner body 514. The first cross-sectional area 556 is greater than the second cross-sectional area 558. Thus, the inner surface 532 of the outer body 512 and the outer surface 542 of the inner body 514 converge from the first end 538 of the inner body 514 to the second end 540 of the inner body 514. Optionally, the first cross-sectional area 556 can be disposed at the first end 554' of the channel 554 and the second cross-sectional configuration 558 can be disposed at the second end 554" of the channel 554. By reducing the cross-sectional area of the channel 554 from the first end 538 of the inner body 514 to the second end 540 of the inner body 514, fluid accelerates as it is passed through the channel 554 and exits the low drag low noise device 510 at a velocity that is greater than the velocity at which it entered the low drag low noise device 510.

In the illustrated embodiment, the channel 554 has a first height at the first end 554" of the channel 554 and a second height at the second end 554" of the channel 554. The first height is measured on an axis that is perpendicular to the lengthwise axis 511 of the low drag low noise device. The second height is measured on an axis that is perpendicular to the lengthwise axis 511 of the low drag low noise device 510. The second height of the channel is equal to between about 0.01% and about 5.0% of the first diameter 543 (e.g., width of trailer, diameter of component to which the low drag low noise device is attached, the corresponding diameter) or the second diameter 543' (e.g., height of trailer, diameter of the component to which the low drag low noise device is attached, the corresponding diameter) of the second end 540 of the inner body 514. However, in embodiments in which the first diameter and/or the second diameter are different, or vary, alternative embodiments can have a channel that has a second height that is equal to between about 0.01% and about 5.0% of the average height of the first diameter and/or the second diameter. The first height of the channel 554 is equal to between about 1.1 times to about 10 times the value of the second height. However, alternative embodiments can include any suitable first height and/or second height for a channel, and skilled artisans will be able to select a suitable height for a channel according to a particular embodiment based on various considerations, including the desired flow characteristics intended to be achieved. For example, a second height of a channel can be equal to between about 0.1% and about 2.0% of the first diameter 543 (e.g., width of trailer, diameter of the component to which the low drag low noise device is attached, the corresponding diameter) or the second diameter 543' (e.g., height of trailer, diameter of the component to which the low drag low noise device is attached, the corresponding diameter) of the second end 540 of the inner body 514. For example, the first height of the channel 554 can be equal to between about 2 times to about 5 times the value of the second height.

The inner surface 532 of the outer body 512 and the outer surface 542 of the inner body 514 are configured to allow a fluid (e.g., air) to pass through the channel 554 from the first end 522 of the outer body 512 to the second end 524 of the outer body 512 such that the fluid exits the channel 554 at the second end 524 of the outer body 512 at an angle 560. The angle 560 is directed toward the lengthwise axis 511 of the low drag low noise device 510 and away from the rear end 604 of the vehicle 600 (e.g., rear end 618 of trailer 614). Alternatively, the angle 560 can be directed toward an axis that is parallel to the freestream flow of fluid through which the low drag low noise device 510 is traveling and that extends through a portion of the inner body 514 of the low drag low noise device 510. Angle 560 is measured relative to an axis that contains the second end 524 of the outer body 512 and that is parallel to the lengthwise axis 511 of the low drag low noise device 510. Alternatively, the angle 560 can be measured relative to an axis that contains the second end 524 of the outer body 512 and that is parallel to the freestream flow of fluid through which the low drag low noise device 510 is traveling. While angle 560 has been illustrated as constant about the circumference of the second end 540 of the inner body 514, angle 560 can alternatively vary about the circumference of the second end 540 of inner body 514. For example, fluid can exit the channel defined by a low drag low noise device at a first angle and a second angle at the second end of channel. The first angle can be different from, or the same as, the second angle and can comprise any suitable angle, such as those described herein with respect to angle 560.

During travel, the channel 554 directs the flow of fluid (e.g., air) through the low drag low noise device 510 to accomplish a reduction in noise and/or drag relative to a motor vehicle that does not include a low drag low noise device. During use, fluid enters the low drag low noise device 510 through the first opening 528 of the outer body 512 and is directed through channel 554 between the outer body 512 and the inner body 514 and exits through the second opening 530 defined by the outer body 512 as a jet of fluid 564. The jet of fluid 564 travels at a specific velocity and at angle 560. This is best shown in FIG. 30. Based on angle 560, the noise level and/or drag is reduced as a result of jet of fluid 564 altering the base flow relative to a device that does not include a channel. In addition, as a result of the jet of fluid 564 converging toward the lengthwise axis 511 of the low drag low noise device 510 a smooth virtual trailing edge, or boat-tail, is created. This smooth trailing edge, or boat-tail, prevents or reduces vortex shedding and increases base pressure relative to devices that do not include a channel, such as those illustrated in FIGS. 1 through 4. By reducing vortex shedding and increasing the base pressure, the noise and/or drag produced by the low drag low noise device 510 is reduced relative to devices that do not include a channel, such as those illustrated in FIGS. 1 through 4.

The angle and velocity at which the jet of fluid 564 exits the channel 554 will be based on a number of characteristics, such as the structural arrangement of the outer surface 526 of the outer body 512, the structural arrangement between the outer body 512 and the inner body 514 at the first end 522 and second end 524 of the outer body 512, the structural arrangement between the outer body 512 and the inner body 514 along channel 554, the first cross-sectional area 556, and/or the second cross-sectional area 558. It is to be understood that the above characteristics of the low drag low noise device 510 may be modified within the scope of the present disclosure in the interest of obtaining the optimum exit angle and velocity which results in the greatest reduction in noise and/or drag.

While the vehicle 600 has been illustrated as a semi-truck with an attached trailer 614, a low drag low noise device can be attached to any suitable motor vehicle, or component attached to a motor vehicle, and at any suitable location on the motor vehicle or component, and skilled artisans will be able to select a suitable motor vehicle or component to attach a low drag low noise device according to a particular embodiment based on various considerations, including the structural configuration of the motor vehicle or component. For example, a vehicle can comprise any motor vehicle, truck, semi-truck, pick-up truck, car, bus, SUV, van, locomotive, aircraft, flying object, airplane, projectile, rocket, missile, jet, ship, boat, and any other object that can travel through a fluid, such as air.

Figure 31:
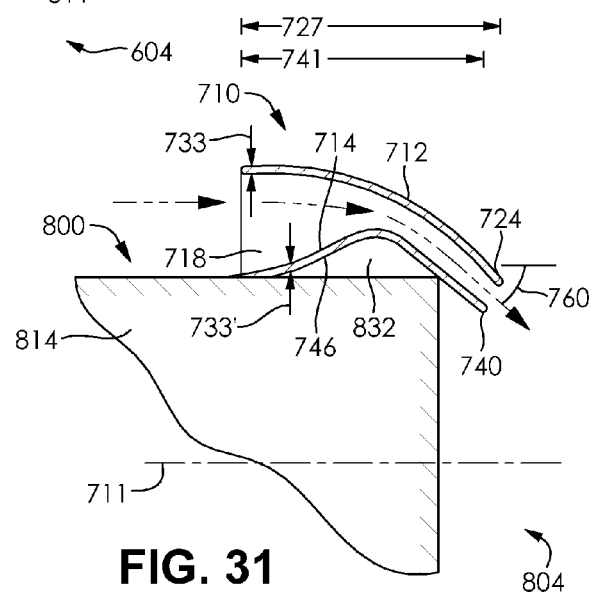
FIG. 31 is a partial sectional view of another low drag low noise device attached a motor vehicle.

FIG. 31 illustrates another low drag low noise device 710. Low drag low noise device 710 is similar to the low drag low noise device 510 illustrated in FIGS. 29 and 30 and described above, except as detailed below. Reference numbers in FIG. 31 refer to the same structural element or feature referenced by the same number in FIGS. 29 and 30, offset by 200. Thus, low drag low noise device 710 comprises an outer body 712, an inner body 714, and a plurality of connection fins 718.

In the illustrated embodiment, the low drag low noise device 710 is attached to the vehicle 800 (e.g., trailer 814) between its front end and rear end 804 such that the second end 724 of the outer body 712 and the second end 740 of the inner body 714 are disposed beyond the rear end 804 of the vehicle 800 (e.g., rear end of the trailer 814). Thus, the rear end 804 of the vehicle 800 is disposed on a first plane that is disposed orthogonal to the lengthwise axis 711 of the low drag low noise device 710 and that extends through the outer body 712 and the inner body 714. The second end 724 of the outer body 712 is disposed on a second plane that is disposed orthogonal to the lengthwise axis 711 of the low drag low noise device 710. The second end 740 of the inner body 714 is disposed on a third plane that is disposed orthogonal to the lengthwise axis 711 of the low drag low noise device 710. The first plane is disposed between the front end of the vehicle 800 and the second plane. The third plane is disposed between the first plane and the second plane. Alternatively, the second plane and the third plane can be coplanar.

In the illustrated embodiment, the outer body 712 has a thickness 733 that is constant along its length 727 and the inner body 714 has a thickness 733' that is constant along its length 741. The thickness 733 of the outer body 712 is equal to the thickness 733' of the inner body 714. However, alternative embodiments can include an outer body that has a thickness that is not equal to (e.g., greater than, less than) the thickness of the inner body. In addition, alternative embodiments can include an outer body and/or an inner body that has a thickness that varies along the length of the outer body and/or inner body.

In the illustrated embodiment, when the inner body 714 is attached to another component, such as the vehicle 800, it creates a void 832 between the inner surface 746 of the inner body 714 and the outer surface of the component to which the low drag low noise device 710 is attached (e.g., vehicle 800, trailer 814). However, alternative embodiments can omit the inclusion of a void (e.g., void 832) by forming the inner body as a portion of the component to which the outer body is attached (e.g., inner body is formed as part of the vehicle, inner body is formed as part of the trailer). In these alternative embodiments, the inner body comprises a portion of the vehicle (e.g., trailer).

Figure 32:
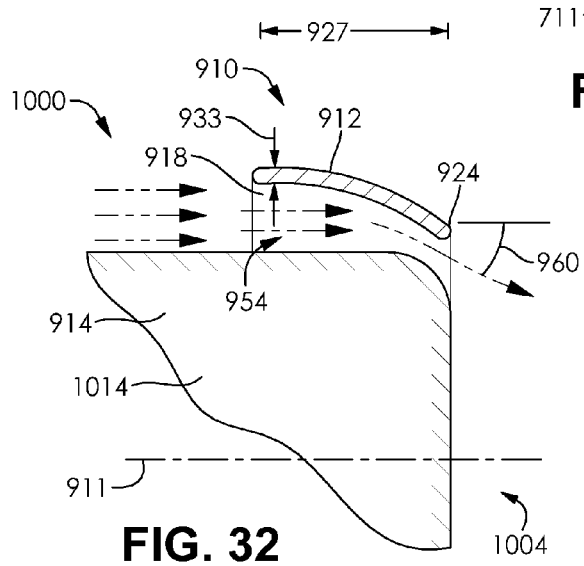
FIG. 32 is a partial sectional view of another low drag low noise device attached to a motor vehicle.

FIG. 32 illustrates another low drag low noise device 910. Low drag low noise device 910 is similar to the low drag low noise device 710 illustrated in FIGS. 29 and 30 and described above, except as detailed below. Reference numbers in FIG. 32 refer to the same structural element or feature referenced by the same number in FIGS. 29 and 30, offset by 400. Thus, low drag low noise device 910 comprises an outer body 912, an inner body 914, and a plurality of connection fins 918.

In the illustrated embodiment, the outer body 912 has a thickness 933 that is constant along its length 927 and the inner body 914 comprises a portion of the vehicle 1000 (e.g., a portion of trailer 1014). The length of the inner body 914 is greater than the length 927 of the outer body 912. In the embodiment illustrated, the second end 924 of the outer body 912 is disposed on a plane that is contains the rear end 1004 of the vehicle 1000 and that is disposed orthogonal to the lengthwise axis 911 of the low drag low noise device 910. The inner body 914 has a first portion that extends on an axis that is parallel to the lengthwise axis 911 of the low drag low noise device 910 and a second portion that is curved toward the lengthwise axis 911 of the low drag low noise device 910. This structural configuration forms a converging channel 954, as described herein, such that the fluid exits the channel 954 at the second end 924 of the outer body 912 at an angle 960.

While the second end 924 of the outer body 912 has been described as being disposed on a plane that contains the rear end of the vehicle 1000 (e.g., rear end of trailer 1014) and that is disposed orthogonal to the lengthwise axis 911 of the low drag low noise device 910, the second end of an outer body can be positioned at any suitable location and at any suitable angle. For example, the second end of an outer body can be positioned on a plane that is disposed orthogonal to the lengthwise axis of the low drag low noise device and that is positioned between the front end and the rear end, or beyond the rear end (e.g., downstream), of the component to which the low drag low noise device is attached.

Figure 33:
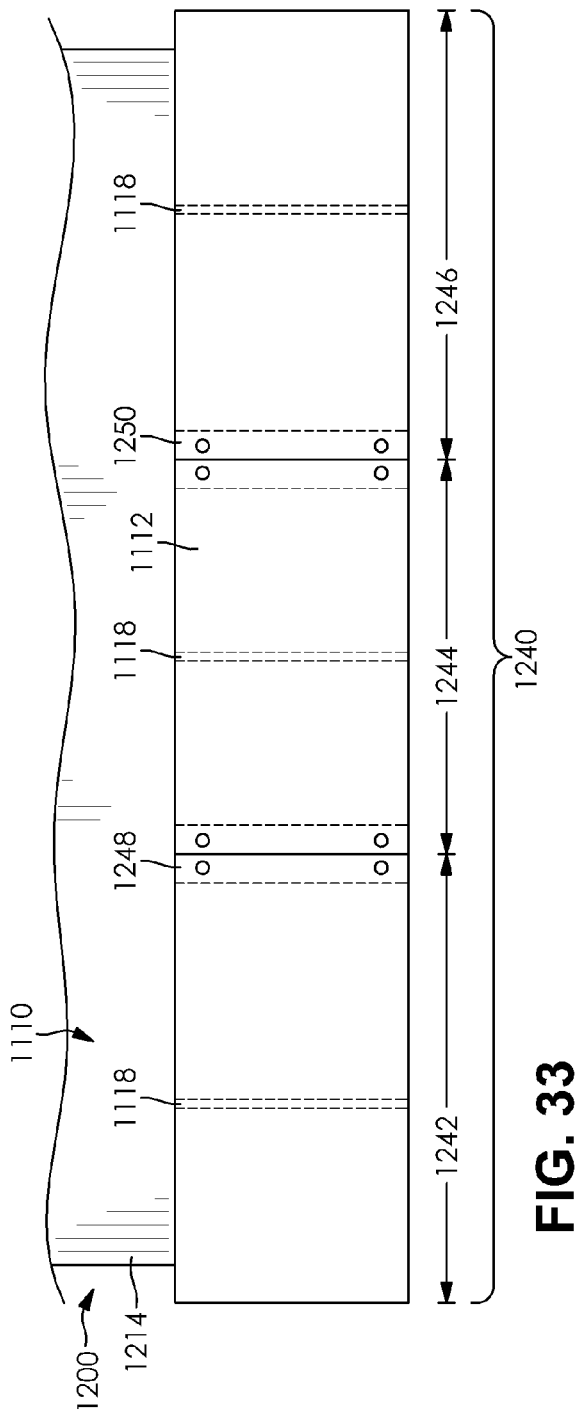
FIG. 33 is a top view of a portion of another low drag low noise device. The low drag low noise device is in a first configuration.
Figure 34:
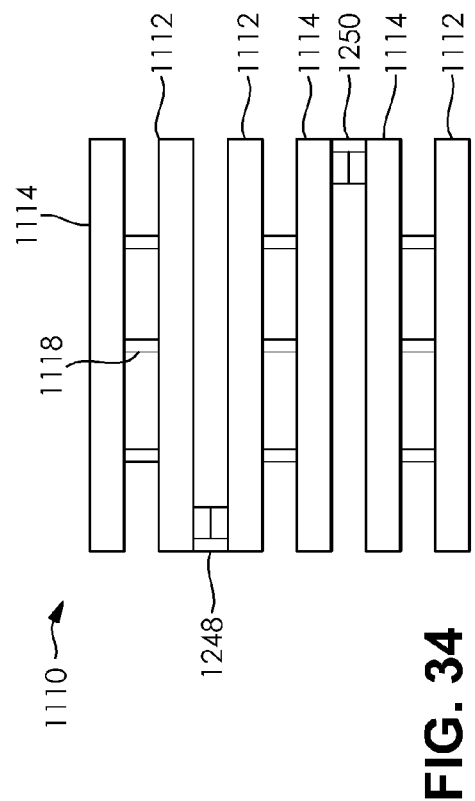
FIG. 34 is a side view of the low drag low noise device illustrated in FIG. 33. The low drag low noise device is in a second configuration.

FIGS. 33 and 34 illustrate another low drag low noise device 1110. Low drag low noise device 1110 is similar to the low drag low noise device 710 illustrated in FIG. 31 and described above, except as detailed below. Reference numbers in FIGS. 33 and 34 refer to the same structural element or feature referenced by the same number in FIG. 31, offset by 400. Thus, low drag low noise device 1110 comprises an outer body 1112, an inner body 1114, and a plurality of connection fins 1118.

FIG. 33 is a top view of a portion 1240 of the low drag low noise device 1110 that is releasably attached to the roof of the vehicle 1200 (e.g., trailer 1214). The portion 1240 comprises a first segment 1242, a second segment 1244, and a third segment 1246 and is moveable between a first configuration and a second configuration. The first segment 1242 is hingedly attached to the second segment 1244 by first hinge 1248. The second segment 1244 is hingedly attached to the third segment 1246 by second hinge 1250. Each of the first segment 1242, second segment 1244, and third segment 1246 is moveable between a first position and a second position, as described in more detail herein. While only a portion 1240 of the low drag low noise device 1110 has been illustrated as formed of a plurality of segments, the entirety, or a portion, of the low drag low noise device 1110 can be formed of a plurality of segments, such as those described.

The first segment 1242 is attached to the second segment 1244 using any suitable type of hinged attachment. In the illustrated embodiment, the first hinge 1248 is a piano hinge. The second segment 1244 is attached to the third segment 1246 using any suitable type of hinged attachment. In the illustrated embodiment, the second hinge 1250 is a piano hinge. Skilled artisans will be able to select a suitable type of hinge to attach a first segment to a second segment and to attach a second segment to a third segment according to a particular embodiment based on various considerations, such as that material(s) that forms each segment. Example hinges considered suitable include, but are not limited to, strap hinges, tee hinges, butt hinges, offset hinges, swing-away hinges, continuous hinges, piano hinges, living hinges, and any other hinge considered suitable for a particular embodiment.

When each of the segments 1242, 1244, 1246 is in the first position, as illustrated in FIG. 33, the portion 1240 of the low drag low noise device 1110 is in the first configuration and the first segment 1242, the second segment 1244, and the third segment 1246 are disposed on a plane. In the first position, the first segment 1242 is fixed relative to the second segment 1244 and the second segment is fixed relative to the third segment 1246. Fixing the first segment 1242 to the second segment 1244 and the second segment 1244 to the third segment 1246 can be accomplished using any suitable structure, including but not limited to, fasteners, latches, compression latches, pull action latches, using threaded connections, and any other structures considered suitable for a particular embodiment.

When each of the segments 1242, 1244, 1246 is in the second position, as illustrated in FIG. 34, the portion 1240 of the low drag low noise device 1110 is in the second configuration and the first segment 1242 is disposed parallel to the second segment 1244 and the second segment 1244 is disposed parallel to the third segment 1246. Movement of the segments 1242, 1244, 1246 between their respective first positions and second positions provides a mechanism for moving the low drag low noise device 1110 between its first configuration and second configuration. In the first configuration, the low drag low noise device 1110 is assembled and configured for use. In the second configuration, the low drag low noise device 1110 is collapsed on itself such that it can be shipped or moved from a first location to a second location.

The low drag low noise device 1110 can be releasably attached to the motor vehicle 1200 (e.g., trailer 1214) using any suitable method or technique, and skilled artisans will be able to select a suitable method or technique to attach a low drag low noise device to another component, such as a trailer or motor vehicle, according to a particular embodiment based on various considerations, including the material(s) that forms the component and/or the low drag low noise device. Example methods and techniques considered suitable to attach a low drag low noise device to another component, such as a trailer or a motor vehicle, include using one or more straps, threaded components (e.g., screws, nuts, bolts), defining a flange on a portion or the entirety of the inner body that is sized and configured to be received by a slot or recess defined by the component, and any other method or technique considered suitable for a particular embodiment.

While the portion 1240 of the low drag low noise device 1110 has been illustrated as having a first segment 1242, a second segment 1244, and a third segment 1246, a low drag low noise device, or a portion of a low drag low noise device, can have any suitable number of segments that are moveably, hingedly, or releasably attached to one another. Skilled artisans will be able to select a suitable number of segments to form a low drag low noise device according to a particular embodiment based on various considerations, including the circumference of the low drag low noise device. Example number of segments considered suitable to form a low drag low noise device, or a portion of a low drag low noise device, include one, at least one, two, a plurality, three, four, five, six, and any other number of segments considered suitable for a particular embodiment.

While the segments 1242, 1244, 1246 have been illustrated as hingedly attached to one another, the segments of a low drag low noise device can alternatively be releasably attached to one another when in the first position such that that they can be detached from one another to be positioned in the second position. Releasable attachment can be accomplished using any suitable structure, such as hinges, compression hinges, snap fit configurations, tongue and groove configurations, sliding lock configurations, those described herein, and any other structure, method, or technique considered suitable for a particular embodiment.

Figure 35:
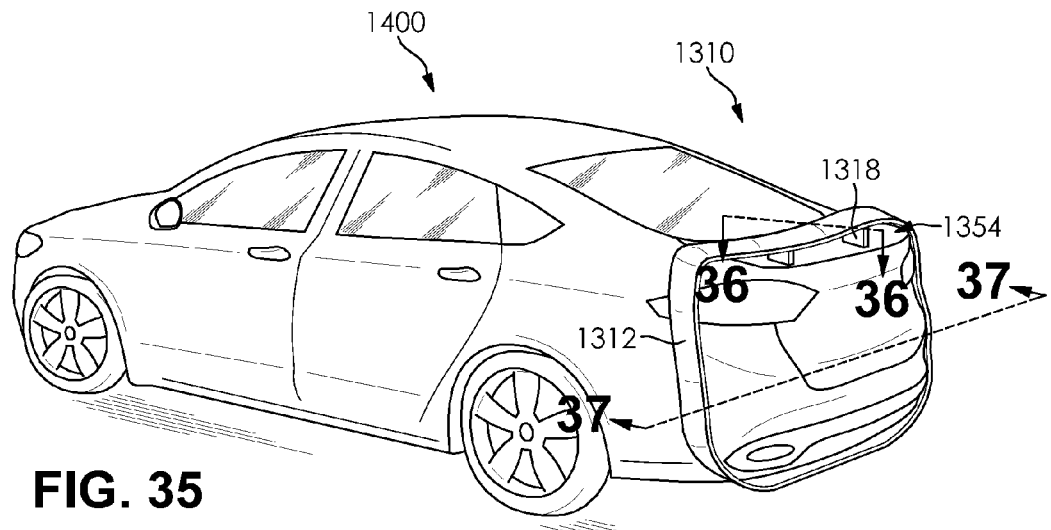
FIG. 35 is a perspective view of a motor vehicle with an attached low drag low noise device.
Figures 36, 37:
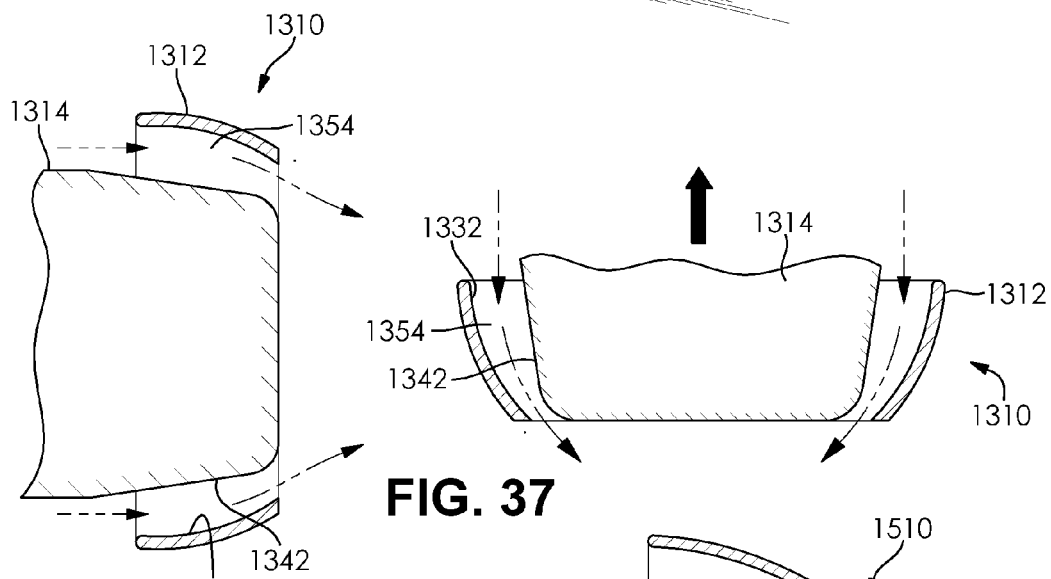
FIG. 36 is a partial sectional view of the motor vehicle and low drag low noise device illustrated in FIG. 35, taken along line 36-36.
FIG. 37 is a partial sectional view of the motor vehicle and low drag low noise device illustrated in FIG. 35, taken along line 37-37.

FIGS. 35, 36 and 37 illustrate another low drag low noise device 1310. Low drag low noise device 1310 is similar to the low drag low noise device 910 illustrated in FIG. 32 and described above, except as detailed below. Reference numbers in FIGS. 35, 36, and 37 refer to the same structural element or feature referenced by the same number in FIG. 32, offset by 400. Thus, low drag low noise device 1310 comprises an outer body 1312, an inner body 1314, and a plurality of connection fins 1318.

In the illustrated embodiment, the inner body 1314 comprises a portion of the component on which the outer body 1312 is attached using the plurality of connection fins 1318. In the embodiment illustrated, the component is a vehicle 1400 (e.g., a car).

The outer body 1312 extends around the entire circumference of the inner body 1314 and forms the channel 1354 between the inner surface 1332 of the outer body 1312 and the outer surface 1342 of the inner body 1314. While the outer body 1312 has been illustrated as being disposed around the entire circumference of the inner body 1314, alternative embodiments can include an outer body that extends around a portion of the circumference of the inner body.

Figure 38:
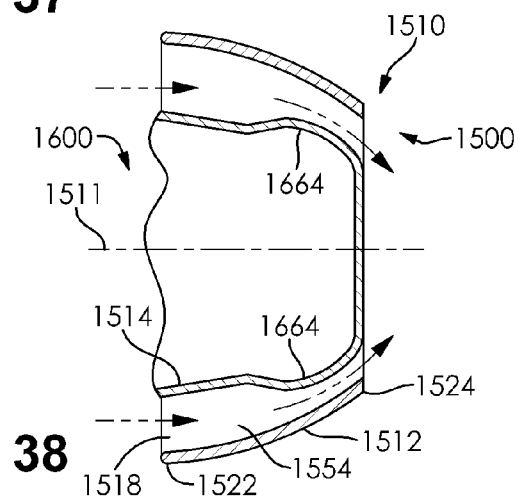
FIG. 38 is a partial sectional view of a motor vehicle with an attached low drag low noise device.

FIG. 38 illustrates another low drag low noise device 1510. Low drag low noise device 1510 is similar to the low drag low noise device 1310 illustrated in FIGS. 35, 36, and 37 and described above, except as detailed below. Reference numbers in FIG. 38 refer to the same structural element or feature referenced by the same number in FIGS. 35, 36, and 37, offset by 200. Thus, low drag low noise device 1510 comprises an outer body 1512, an inner body 1514, and a plurality of connection fins 1518.

In the illustrated embodiment, the inner body 1514 defines a convex portion 1664 that extends away from the lengthwise axis 1511 of the low drag low noise device 1510. The convex portion 1664 is disposed between the first end 1522 and the second end 1524 of the outer body 1512 and extends into the passageway 1554. This structural arrangement forms the channel 1554 that converges from the first end 1522 of the outer body 1512 to the second end 1524 of the outer body 1512. The convex portion 1664 extends around the entire circumference of the vehicle 1600. However, alternative embodiments can include a convex portion that extends around a portion of the circumference of the vehicle.

Figure 39:
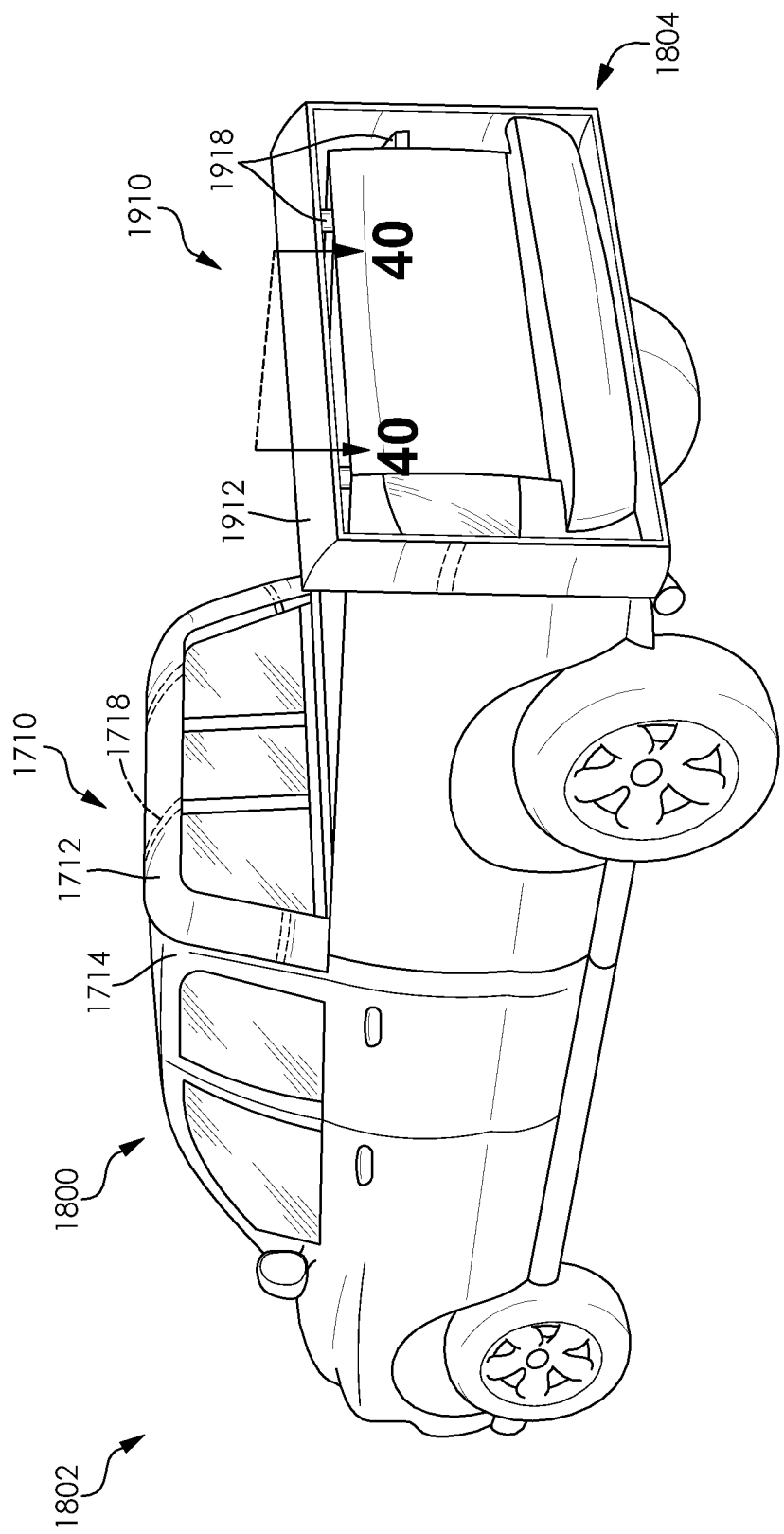
FIG. 39 is a perspective view of a motor vehicle with an attached low drag low noise device.
Figure 40:
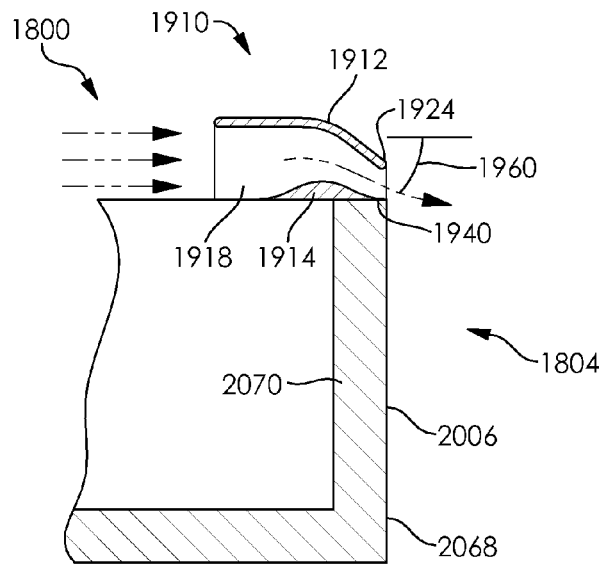
FIG. 40 is a partial sectional view of the motor vehicle and low drag low noise device illustrated in FIG. 39, taken along line 40-40.

FIGS. 39 and 40 illustrate a first low drag low noise device 1710 and a second low drag low noise device 1910 attached to a vehicle 1800. The first low drag low noise device 1710 is similar to the low drag low noise device 1310 illustrated in FIGS. 35, 36, and 37 and described above, except as detailed below. The second low drag low noise device 1910 is similar to the low drag low noise device 510 illustrated in FIGS. 29 and 30. With respect to the first low drag low noise device 1710, reference numbers in FIGS. 39 and 40 refer to the same structural element or feature referenced by the same number in FIGS. 35, 36, and 37, offset by 400. With respect to the second low drag low noise device 1910, reference numbers in FIGS. 39 and 40 refer to the same structural element or feature referenced by the same number in FIGS. 29 and 30, offset by 1400. Thus, the first low drag low noise device 1710 comprises an outer body 1712, an inner body 1714, and a plurality of connection fins 1718 and the second low drag low noise device 1910 comprises an outer body 1912, an inner body 1914, and a plurality of connection fins 1918.

In the illustrated embodiment, the first low drag low noise device 1710 is attached between the front end 1802 and the rear end 1804 of the vehicle 1800 and extends around a portion of the circumference of the inner body 1714 (e.g., the roof, the first side, the second side). The inner body of the first low drag low noise device 1710 comprises a portion of the vehicle 1800. While the first low drag low noise device 1710 has been illustrated as extending around a portion of the circumference of the inner body 1714, a low drag low noise device can extend around any suitable portion of the circumference of an inner body, or a vehicle. For example, a low drag low noise device can extend around the circumference of an inner body, or a vehicle, such that is forms a closed circumference, or extends around a partial circumference of the inner body, or vehicle.

In the illustrated embodiment, the second low drag low noise device 1910 is attached between the first low drag low noise device 1710 and the rear end 1804 of the vehicle 1800. The second low drag low noise device 1910 is attached to the vehicle 1800 and extends around the entire circumference of the vehicle 1800. The second end 1924 of the outer body 1912 and the second end 1940 of the inner body 1914 are disposed on a plane that contains a portion, or the entirety, of the base surface 2066 of the vehicle 1800. In the embodiment illustrated, the base surface 2066 is the rear surface 2068 of a tailgate 2070. The low drag low noise device 1910 can optionally define a first slot and a second slot along a portion of the low drag low noise device that provide a mechanism to open and close the tailgate 2070 in a conventional manner. While the tailgate 2070 has been illustrated as the base surface 2066, any other surface of a motor vehicle, or a component attached to a motor vehicle (e.g., a trailer, side view mirror) can form the base surface. While the second low drag low noise device 1910 has been illustrated as extending around the entire circumference of the vehicle 1800, a low drag low noise device can extend around any suitable portion of the circumference of a vehicle. For example, a low drag low noise device can extend around the circumference of a vehicle such that is forms a closed circumference, or extends around a portion of the circumference of the vehicle (e.g., in embodiments in which a low drag low noise device is attached to a vehicle without a tailgate).

While the second low drag low noise device has been illustrated as a separate component attached to a vehicle, a low drag low noise device can be formed as part of a vehicle. For example, the inner body can comprise the outer surface of the vehicle and the outer body can be attached to the inner body using one or more connection fins.

Figure 41:
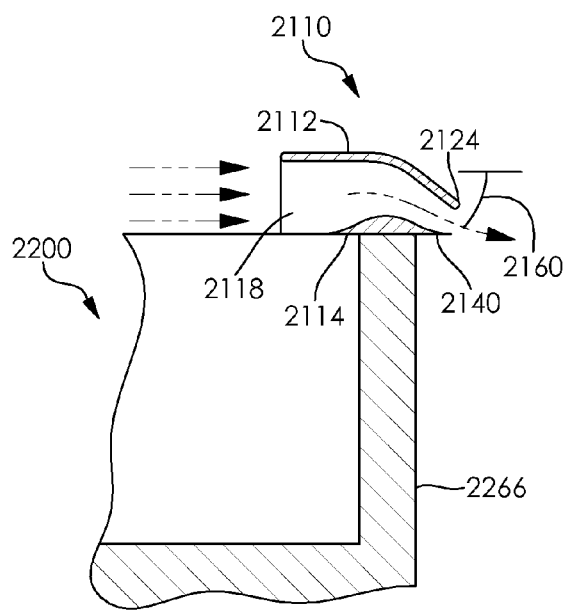
FIG. 41 is a partial sectional view of another low drag low noise device attached to a motor vehicle.

FIG. 41 illustrates another low drag low noise device 2110. Low drag low noise device 2110 is similar to the low drag low noise device 1910 illustrated in FIGS. 39 and 40 and described above, except as detailed below. Reference numbers in FIG. 41 refer to the same structural element or feature referenced by the same number in FIGS. 39 and 40, offset by 200. Thus, low drag low noise device 2110 comprises an outer body 2112, an inner body 2114, and a plurality of connection fins 2118.

In the illustrated embodiment, a portion, or the entirety, of the base surface 2266 of the vehicle 2200 is disposed on a first plane, the second end 2124 of the outer body 2112 is disposed on a second plane, and the second end 2140 of the inner body 2112 is disposed on a third plane. The first plane is disposed between the front end of the vehicle and the second plane. The second plane is coplanar with the third plane. However, alternative embodiments can include a second plane that is not coplanar with a third plane (e.g., second plane is disposed between the first plane and the third plane).

Figure 42:
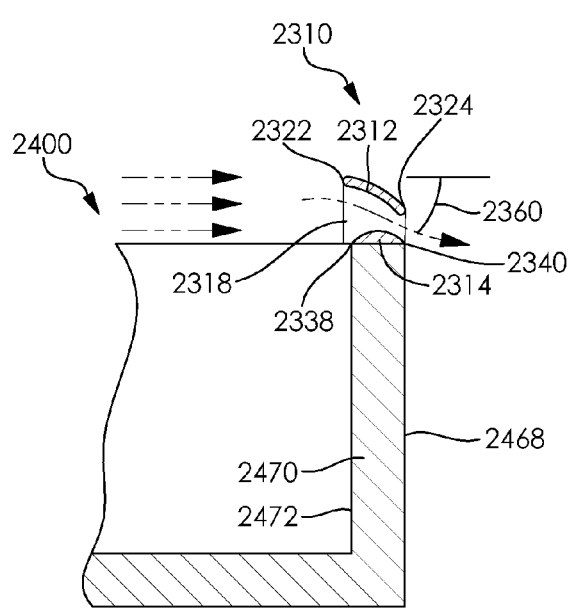
FIG. 42 is a partial sectional view of another low drag low noise device attached to a motor vehicle.

FIG. 42 illustrates another low drag low noise device 2310. Low drag low noise device 2310 is similar to the low drag low noise device 1910 illustrated in FIGS. 39 and 40 and described above, except as detailed below. Reference numbers in FIG. 42 refer to the same structural element or feature referenced by the same number in FIGS. 39 and 40, offset by 400. Thus, low drag low noise device 2310 comprises an outer body 2312, an inner body 2314, and a plurality of connection fins 2318.

In the illustrated embodiment, the tailgate 2470 has a rear surface 2468 and a front surface 2472 and the low drag low noise device 2310 has a configuration as described below. The first end 2322 of the outer body 2312 is disposed on a first plane. The second end 2324 of the outer body 2312 is disposed on a second plane. The first end 2338 of the inner body 2314 is disposed on a third plane. The second end 2340 of the inner body 2314 is disposed on a fourth plane. The front surface 2472 of the tailgate 2470 is disposed on a fifth plane. The rear surface 2468 of the tailgate 2470 is disposed on a sixth plane. The first plane is disposed between the front end of the vehicle 2400 and the tailgate 2470. The second plane is coplanar with the fourth plane and the sixth plane. The third plane is disposed between the first plane and the second plane and is coplanar with the fifth plane.

Figure 43:
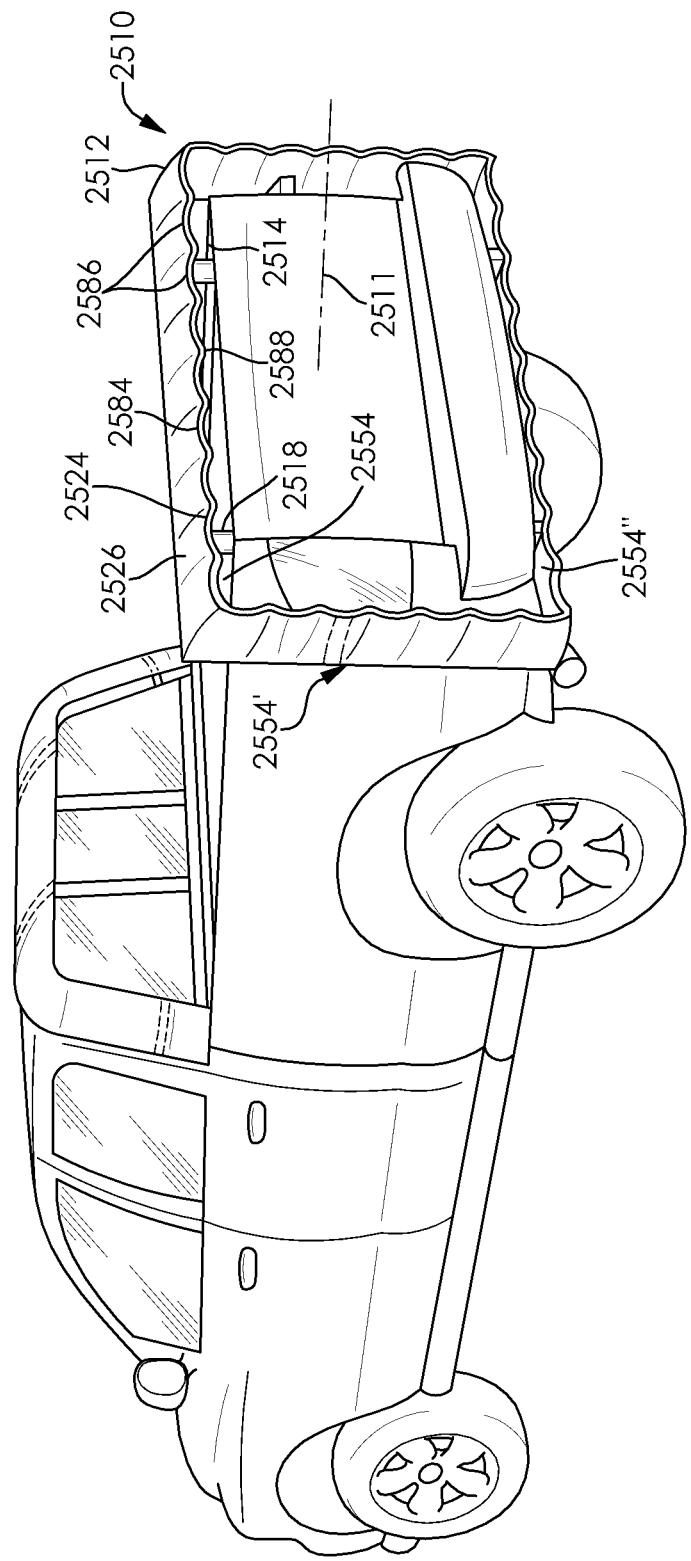
FIG. 43 is a perspective view of a motor vehicle with an attached low drag low noise device.

FIG. 43 illustrates another low drag low noise device 2510. Low drag low noise device 2510 is similar to the low drag low noise device 1910 illustrated in FIGS. 39 and 40 and described above, except as detailed below. Reference numbers in FIG. 43 refer to the same structural element or feature referenced by the same number in FIGS. 39 and 40, offset by 600. Thus, low drag low noise device 2510 comprises an outer body 2512, an inner body 2514, and a plurality of connection fins 2518.

In the illustrated embodiment, the second end 2524 of the outer body 2512 defines a sinusoidal edge 2584 and the outer surface 2526 has a waved configuration that corresponds to the to the sinusoidal edge 2584. Sinusoidal edge 2584 is defined along a plane that is orthogonal to the lengthwise axis 2511 of the low drag low noise device 2510. The sinusoidal edge 2584 comprises a plurality of peaks 2586 and troughs 2588 and can comprise any suitable amplitude and frequency. This structural arrangement provides a mechanism for enhancing the mixture of fluid that passes over the outer surface 2526 of the outer body 2512 and that travels through passageway 2554.

While the second end 2524 of the outer body 2512 has been described as having a sinusoidal edge 2584, the second end of the outer body of a low drag low noise device can define any suitable structural configuration. Skilled artisans will be able to select a suitable structural configuration for the second end of an outer body according to a particular embodiment based on various considerations, including the flow characteristics intended to be achieved. Example structural configurations considered suitable include curved, wavy, angled, sinusoidal, and any other structural configuration considered suitable for a particular embodiment.

While the second end 2524 of the outer body 2512 and a portion of the outer surface 2526 of the outer body 2512 have been illustrated as having a particular structural arrangement, the outer body of a low drag low noise device can have any suitable structural arrangement. Skilled artisans will be able to select a suitable structural arrangement for the outer body of a low drag low noise device according to a particular embodiment based on various considerations, including the flow characteristics intended to be achieved. Alternative to defining a sinusoidal edge that is defined on a plane that is orthogonal to the lengthwise axis of a low drag low noise device, a sinusoidal edge can be defined as described with respect to FIGS. 26, 27, and 28.

The first end 2554' and second end 2554" of channel 2554 can comprise any suitable cross-sectional area, and skilled artisans will be able to select a suitable cross-sectional area for the first end and second end of a channel according to a particular embodiment based on various considerations, including the desired flow characteristics intended to be achieved at the first end and/or second end of the channel. Example ratios considered suitable between a first cross-sectional area at the first end of a channel (e.g., disposed on a first plane that is orthogonal to the lengthwise axis of a low drag low noise device) and a second cross-sectional area at the second end of a channel (e.g., disposed on a second plane that is orthogonal to the lengthwise axis of the low drag low noise device and parallel to the first plane) include ratios equal to 1.0, equal to about 1.0, equal to 1.1, equal to about 1.1, equal to 2.0, equal to about 2.0, equal to 3.0, equal to about 3.0, equal to 8.0, equal to about 8.0, equal to 10.0, equal to about 10.0, equal to between 1.0 and 10, and equal to between about 1.0 and about 10.

The foregoing detailed description provides exemplary embodiments of the invention and includes the best mode for achieving a low drag low noise device. The description and illustration of these embodiments is intended only to provide examples of the invention, and not to limit the scope of the invention, or its protection, in any manner. It is to be understood that modifications and variations can be made to the embodiments described herein without departing from the spirit and scope of the disclosure.

What is claimed is:

1. A low drag low noise device for use on a vehicle having a front end, a rear end, and a circumference, the low drag low noise device having a lengthwise axis and comprising:

an outer body having a first end and a second end, the outer body defining a first opening, a second opening, and an inner surface, the inner surface extending from the first opening to the second opening and defining a passageway; and an inner body attached to said vehicle and to the outer body, the inner body at least partially disposed within the passageway defined by the outer body, the inner body having a first end, a second end, an inner surface, and an outer surface;

wherein the inner surface of the outer body and the outer surface of the inner body define a channel within the passageway of the outer body, the channel having a first cross-sectional area disposed on a first plane and a second cross-sectional area disposed on a second plane, the first plane disposed orthogonal to said lengthwise axis of said low drag low noise device, the first plane disposed between the first end of the inner body and the second end of the inner body, the second plane disposed orthogonal to said lengthwise axis of said low drag low noise device, the second plane disposed between the first plane and the second end of the inner body, the first cross-sectional area being greater than the second cross-sectional area such that the channel converges from the first end of the inner body to the second end of the inner body, the channel configured to allow a fluid to pass through the channel from the first end of the outer body to the second end of the outer body such that the fluid exits the channel at the second end of the outer body at an angle that is directed toward said lengthwise axis of said low drag low noise device and away from the second end of the inner body.

2. The low drag low noise device of claim 1, wherein the channel is defined about the entire circumference of said vehicle.

3. The low drag low noise device of claim 1, wherein the inner surface of the inner body has a diameter;

wherein the channel has a first end and a second end, the channel having a first height at the first end of the channel that is measured on an axis that is perpendicular to said lengthwise axis of said low drag low noise device, the channel having a second height at the second end of the channel that is measured on an axis that is perpendicular to said lengthwise axis of said low drag low noise device;

wherein the first height of the channel is equal to between about 1.1 to about 10 times the second height; and wherein the second height is equal to between about 0.01% and about 5.0% of the diameter of the inner surface of the inner body.

4. The low drag low noise device of claim 1, wherein the inner surface of the inner body has a diameter;

wherein the channel has a first end and a second end, the channel having a first height at the first end of the channel that is measured on an axis that is perpendicular to said lengthwise axis of said low drag low noise device, the channel having a second height at the second end of the channel that is measured on an axis that is perpendicular to said lengthwise axis of said low drag low noise device;

wherein the first height of the channel is equal to between about 2 to about 5 times the second height; and wherein the second height is equal to between about 0.1% and about 2.0% of the diameter of the inner surface of the inner body.

5. The low drag low noise device of claim 1, wherein the angle is between about 0 degrees and about 50 degrees relative to an axis that contains the second end of the outer body and that is parallel to said lengthwise axis of said low drag low noise device.

6. The low drag low noise device of claim 1, wherein the outer surface of the inner body has an outer surface section that extends from a first end to a second end, the first end of the outer surface section is disposed between the first end and the second end of the inner body, the second end of the outer surface section is disposed between the first end of the outer surface section and the second end of the inner body, the outer surface section extending toward said lengthwise axis of said low drag low noise device from the first end of the outer surface section to the second end of the outer surface section at angle between about 0 degrees and about 50 degrees relative to an axis that contains the second end of the outer body and that is parallel to said lengthwise axis of said low drag low noise device.

7. The low drag low noise device of claim 1, wherein the outer body has a length that extends from the first end of the outer body to the second end of the outer body;

wherein the inner body has a length that extends from the first end of the inner body to the second end of the inner body; and wherein the length of the inner body is different than the length of the outer body.

8. The low drag low noise device of claim 7, wherein the length of the inner body is greater than the length of the outer body; and wherein the first end of the inner body is disposed outside of the passageway defined by the outer body.

9. The low drag low noise device of claim 1, wherein said rear end of said vehicle is disposed on a third plane that is orthogonal to said lengthwise axis of said low drag low noise device, the third plane extending through the outer body and the inner body;

wherein the second end of the outer body is disposed on a fourth plane that is orthogonal to said lengthwise axis of said low drag low noise device;

wherein the second end of the inner body is disposed on a fifth plane that is orthogonal to said lengthwise axis of said low drag low noise device;

wherein the third plane is disposed between said front end of said vehicle and the fourth plane; and wherein the fifth plane is disposed between the third plane and the fourth plane.

10. The low drag low noise device of claim 1, wherein said rear end of said vehicle is disposed on a third plane that is orthogonal to said lengthwise axis of said low drag low noise device;

wherein the second end of the outer body is disposed on a fourth plane that is orthogonal to said lengthwise axis of said low drag low noise device; and wherein the third plane is coplanar with the fourth plane.

11. The low drag low noise device of claim 1, wherein the second end of the outer body defines a sinusoidal edge.

12. A low drag low noise device for use on a vehicle having a front end, a rear end, and a circumference, the low drag low noise device having a lengthwise axis and comprising:

an outer body having a first end, a second end, and a length extending from the first end of the outer body to the second end of the outer body, the outer body defining a first opening, a second opening, and an inner surface, the inner surface extending from the first opening to the second opening and defining a passageway; and an inner body attached to said vehicle and to the outer body, the inner body at least partially disposed within the passageway defined by the outer body, the inner body having a first end, a second end, an inner surface, an outer surface, and a length extending from the first end of the inner body to the second end of the inner body, the length of the inner body being different than the length of the outer body;

wherein the inner surface of the outer body and the outer surface of the inner body define a channel within the passageway of the outer body, the channel defined about the entire circumference of said vehicle, the channel having a first cross-sectional area disposed on a first plane and a second cross-sectional are disposed on a second plane, the first plane disposed orthogonal to said lengthwise axis of said low drag low noise device, the first plane disposed between the first end of the inner body and the second end of the inner body, the second plane disposed orthogonal to said lengthwise axis of said low drag low noise device, the second plane disposed between the first plane and the second end of the inner body, the first cross-sectional area being greater than the second cross-sectional area such that the channel converges from the first end of the inner body to the second end of the inner body, the channel configured to allow a fluid to pass through the channel from the first end of the outer body to the second end of the outer body such that the fluid exits the channel at the second end of the outer body at an angle that is directed toward said lengthwise axis of said low drag low noise device and away from the second end of the inner body, the angle being between about 0 degrees and about 50 degrees relative to an axis that contains the second end of the outer body and that is parallel to said lengthwise axis of said low drag low noise device.

13. The low drag low noise device of claim 12, wherein the inner surface of the inner body has a diameter;
wherein the channel has a first end and a second end, the channel having a first height at the first end of the channel that is measured on an axis that is perpendicular to said lengthwise axis of said low drag low noise device, the channel having a second height at the second end of the channel that is measured on an axis that is perpendicular to said lengthwise axis of said low drag low noise device;
wherein the first height of the channel is equal to between about 1.1 to about 10 times the second height; and
wherein the second height is equal to between about 0.01% and about 5.0% of the diameter of the inner surface of the inner body.

14. The low drag low noise device of claim 12, wherein the inner surface of the inner body has a diameter;
wherein the channel has a first end and a second end, the channel having a first height at the first end of the channel that is measured on an axis that is perpendicular to said lengthwise axis of said low drag low noise device, the channel having a second height at the second end of the channel that is measured on an axis that is perpendicular to said lengthwise axis of said low drag low noise device;
wherein the first height of the channel is equal to between about 2 to about 5 times the second height; and
wherein the second height is equal to between about 0.1% and about 2.0% of the diameter of the inner surface of the inner body.

15. The low drag low noise device of claim 12, wherein the outer surface of the inner body has an outer surface section that extends from a first end to a second end, the first end of the outer surface section is disposed between the first end and the second end of the inner body, the second end of the outer surface section is disposed between the first end of the outer surface section and the second end of the inner body, the outer surface section extending toward said lengthwise axis of said low drag low noise device from the first end of the outer surface section to the second end of the outer surface section at angle between about 0 degrees and about 50 degrees relative to an axis that contains the second end of the outer body and that is parallel to said lengthwise axis of said low drag low noise device.

16. The low drag low noise device of claim 12, wherein the length of the inner body is greater than the length of the outer body; and
wherein the first end of the inner body is disposed outside of the passageway defined by the outer body.

17. The low drag low noise device of claim 12, wherein said rear end of said vehicle is disposed on a third plane that is orthogonal to said lengthwise axis of said low drag low noise device, the third plane extending through the outer body and the inner body;
wherein the second end of the outer body is disposed on a fourth plane that is orthogonal to said lengthwise axis of said low drag low noise device;
wherein the second end of the inner body is disposed on a fifth plane that is orthogonal to said lengthwise axis of said low drag low noise device;
wherein the third plane is disposed between said front end of said vehicle and the fourth plane; and
wherein the fifth plane is disposed between the third plane and the fourth plane.

18. The low drag low noise device of claim 12, wherein said rear end of said vehicle is disposed on a third plane that is orthogonal to said lengthwise axis of said low drag low noise device;
wherein the second end of the outer body is disposed on a fourth plane that is orthogonal to said lengthwise axis of said low drag low noise device; and
wherein the third plane is coplanar with the fourth plane.

19. The low drag low noise device of claim 12, wherein the second end of the outer body defines a sinusoidal edge.

20. A low drag low noise device for use on a vehicle having a front end, a rear end, and a circumference, the low drag low noise device having a lengthwise axis and comprising:
an outer body having a first end, a second end, and a length extending from the first end of the outer body to the second end of the outer body, the outer body defining a first opening, a second opening, and an inner surface, the inner surface extending from the first opening to the second opening and defining a passageway; and
an inner body attached to said vehicle and to the outer body, the inner body at least partially disposed within the passageway defined by the outer body, the inner body having a first end, a second end, an inner surface, an outer surface, and a length extending from the first end of the inner body to the second end of the inner body, the inner surface of the inner body having a diameter, the length of the inner body being different than the length of the outer body;
wherein the inner surface of the outer body and the outer surface of the inner body define a channel within the passageway of the outer body, the channel defined about the entire circumference of said vehicle, the channel having a first cross-sectional area disposed on a first plane, a second cross-sectional area disposed on a second plane, a first end, a second end, a first height, and a second height, the first plane disposed orthogonal to said lengthwise axis of said low drag low noise device, the first plane disposed between the first end of the inner body and the second end of the inner body, the second plane disposed orthogonal to said lengthwise axis of said low drag low noise device, the second plane disposed between the first plane and the second end of the inner body, the first cross-sectional area being greater than the second cross-sectional area such that the channel converges from the first end of the inner body to the second end of the inner body, the channel configured to allow a fluid to pass through the channel from the first end of the outer body to the second end of the outer body such that the fluid exits the channel at the second end of the outer body at an angle that is directed toward said lengthwise axis of said low drag low noise device and away from the second end of the inner body, the angle being between about 0 degrees and about 50 degrees relative to an axis that contains the second end of the outer body and that is parallel to said lengthwise axis of said low drag low noise device, the first height disposed at the first end of the channel, the first height measured on an axis that is perpendicular to said lengthwise axis of said low drag low noise device, the second height disposed at the second end of the channel, the second height measured on an axis that is perpendicular to said lengthwise axis of said low drag low noise device, the first height of the channel being equal to between about 1.1 to about 10 times the second height, the second height being equal to between about 0.01% and about 5.0% of the diameter of the inner surface of the inner body.

* * * * *